United States Patent
Small et al.

(10) Patent No.: US 6,489,751 B2
(45) Date of Patent: Dec. 3, 2002

(54) METHODS AND APPARATUSES FOR RECHARGEABLE BATTERY PACK CHARGERS

(75) Inventors: David Small, San Jose; Brian Farley, Dublin; James McKeefery, Milpitas, all of CA (US)

(73) Assignee: Shoot the Moon Products II, LLC, Pleasanton, CA (US)

(*) Notice: Subject to any disclaimer, the term of this patent is extended or adjusted under 35 U.S.C. 154(b) by 0 days.

(21) Appl. No.: 09/923,824

(22) Filed: Aug. 7, 2001

(65) Prior Publication Data

US 2002/0070709 A1 Jun. 13, 2002

Related U.S. Application Data

(63) Continuation of application No. 09/417,342, filed on Oct. 13, 1999, now Pat. No. 6,326,767.
(60) Provisional application No. 06/127,168, filed on Mar. 30, 1999.

(51) Int. Cl.⁷ .................................................. H02J 7/16
(52) U.S. Cl. ....................................................... 320/150
(58) Field of Search ................................ 320/150, 152, 320/DIG. 18

(56) References Cited

U.S. PATENT DOCUMENTS

| | | | |
|---|---|---|---|
| 3,917,990 A | 11/1975 | Sherman, Jr. ................ | 320/150 |
| 4,179,648 A | 12/1979 | Samsioe ...................... | 320/130 |
| 4,382,219 A | 5/1983 | Heine et al. ................. | 320/106 |
| 4,390,828 A | 6/1983 | Converse et al. ........... | 320/153 |
| 4,424,476 A | 1/1984 | Mullersman ................. | 320/150 |
| 4,426,612 A | 1/1984 | Wienienski et al. ......... | 320/146 |
| 4,433,277 A | 2/1984 | Carollo et al. .............. | 320/149 |
| 4,513,238 A | 4/1985 | Orban ......................... | 320/154 |
| 4,528,492 A | 7/1985 | Inaniwa et al. .............. | 320/150 |
| 4,553,081 A | 11/1985 | Koenck ....................... | 320/131 |
| 4,611,161 A | 9/1986 | Barker ......................... | 320/112 |
| 4,616,171 A | 10/1986 | Hernandez et al. .......... | 320/142 |
| 4,623,832 A | 11/1986 | Fujiwara ..................... | 320/154 |
| 4,631,468 A | 12/1986 | Satoh .......................... | 320/140 |
| 4,636,704 A | 1/1987 | Nakai .......................... | 320/154 |
| 4,649,333 A | 3/1987 | Moore ......................... | 320/152 |
| 4,667,143 A | 5/1987 | Cooper et al. ............... | 320/153 |
| 4,680,527 A | 7/1987 | Benenati et al. ............. | 320/112 |
| 4,686,444 A | 8/1987 | Park ............................ | 320/154 |
| 4,709,202 A | 11/1987 | Koenck et al. .............. | 320/131 |
| 4,712,055 A | 12/1987 | Houser, Jr. .................. | 320/144 |
| 4,725,784 A | 2/1988 | Peled et al. .................. | 320/149 |
| 4,767,977 A | 8/1988 | Fasen et al. ................. | 320/148 |
| 4,820,965 A | 4/1989 | Siemer ........................ | 320/165 |

(List continued on next page.)

FOREIGN PATENT DOCUMENTS

DE  WO 9314548  *  7/1993

*Primary Examiner*—Edward H. Tso
*Assistant Examiner*—Pia Tibbits
(74) *Attorney, Agent, or Firm*—Blakely Sokoloff Taylor & Zafman

(57) ABSTRACT

A system, method and apparatus for charging rechargeable battery packs. A battery charger has a means to measure a voltage and a battery temperature and a means to determine a rate of increase in battery temperature of a rechargeable battery pack. The battery charger to fast charge if the voltage and battery temperature indicate its safe and to terminate the fast charge in response to the charge condition. Methods include measuring a battery temperature of the rechargeable battery pack and determining a rate of increase in battery temperature during fast charging to determine a charge condition, One method further includes terminating fast charging if the rate of increase in battery temperature exceeds a maximum rate or if the increase in battery temperature rises non-logarithmically. Another method further includes terminating fast charging in response to the charge condition.

32 Claims, 10 Drawing Sheets

U.S. PATENT DOCUMENTS

| | | | |
|---|---|---|---|
| 4,829,226 A | 5/1989 | Nakamura et al. | 320/112 |
| 4,853,607 A | 8/1989 | Walter et al. | 320/154 |
| 4,943,498 A | 7/1990 | Cooper et al. | 429/97 |
| 4,998,056 A | 3/1991 | Cole | 320/150 |
| 5,013,993 A | 5/1991 | Bhagwat et al. | 320/150 |
| 5,017,856 A | 5/1991 | Johnson, Jr. | 320/106 |
| 5,057,762 A | 10/1991 | Geodken et al. | 320/116 |
| 5,103,156 A | 4/1992 | Jones et al. | 320/150 |
| 5,136,231 A | 8/1992 | Faulk | 320/134 |
| 5,140,138 A | 8/1992 | Tanaka | 429/97 |
| 5,140,251 A | 8/1992 | Wu | 320/132 |
| 5,157,320 A | 10/1992 | Kuriloff | 320/151 |
| 5,159,258 A | 10/1992 | Kolvites et al. | 320/113 |
| 5,166,596 A | 11/1992 | Goedken | 320/150 |
| 5,180,962 A | 1/1993 | Giancaterino et al. | 320/153 |
| 5,191,275 A | 3/1993 | Singhal | 320/112 |
| 5,200,686 A | 4/1993 | Lee | 320/112 |
| 5,200,687 A | 4/1993 | Lindblom et al. | 320/112 |
| 5,200,690 A | 4/1993 | Uchida | 320/106 |
| 5,204,608 A | 4/1993 | Koenck | 320/112 |
| 5,206,579 A | 4/1993 | Kawate et al. | 320/148 |
| 5,218,284 A | 6/1993 | Burns et al. | 320/112 |
| 5,225,760 A | 7/1993 | Leiserson | 320/112 |
| 5,227,262 A | 7/1993 | Ozer | 429/98 |
| 5,241,259 A | 8/1993 | Patino et al. | 320/150 |
| 5,245,268 A | 9/1993 | Wang | 320/150 |
| 5,247,238 A | 9/1993 | Yang | 320/107 |
| 5,248,927 A | 9/1993 | Takei et al. | 320/113 |
| 5,250,892 A | 10/1993 | Yang | 320/107 |
| 5,254,933 A | 10/1993 | Lin | 320/154 |
| 5,289,102 A | 2/1994 | Toya | 320/148 |
| 5,289,104 A | 2/1994 | Lin | 320/154 |
| 5,291,118 A | 3/1994 | Kojima | 320/150 |
| 5,325,041 A | 6/1994 | Briggs | 320/149 |
| 5,332,957 A | 7/1994 | Lee | 320/106 |
| 5,362,942 A | 11/1994 | Vanderslice, Jr. et al. | 320/128 |
| 5,363,031 A | 11/1994 | Miller et al. | 320/115 |
| 5,378,556 A | 1/1995 | Yung | 429/99 |
| 5,391,972 A | 2/1995 | Gardner et al. | 320/115 |
| 5,391,974 A | 2/1995 | Shiojima et al. | 320/150 |
| 5,410,238 A | 4/1995 | Ishizuka et al. | 320/150 |
| 5,415,947 A | 5/1995 | Mitsui et al. | 429/1 |
| 5,430,363 A | 7/1995 | Kim | 320/128 |
| 5,437,938 A | 8/1995 | Mitsui et al. | 429/1 |
| 5,440,221 A | 8/1995 | Landau et al. | 320/155 |
| 5,444,353 A | 8/1995 | Shinohara et al. | 320/148 |
| 5,459,388 A | 10/1995 | Illingworth et al. | 320/150 |
| 5,473,242 A | 12/1995 | McKenna | 320/113 |
| 5,477,128 A | 12/1995 | Iizuka et al. | 320/163 |
| 5,483,145 A | 1/1996 | Shiojima et al. | 320/150 |
| 5,489,836 A | 2/1996 | Yuen | 320/148 |
| 5,493,198 A | 2/1996 | Kamke | 320/150 |
| 5,497,068 A | 3/1996 | Shiojima | 320/750 |
| 5,506,488 A | 4/1996 | Leiserson | 320/172 |
| 5,518,832 A | 5/1996 | Fernandez et al. | 320/106 |
| 5,519,302 A | 5/1996 | Mino et al. | 320/148 |
| 5,519,303 A | 5/1996 | Goedken et al. | 320/150 |
| 5,543,702 A | 8/1996 | Pfeiffer | 320/110 |
| 5,548,201 A | 8/1996 | Grabon | 320/150 |
| 5,563,495 A | 10/1996 | Tomiyori et al. | 320/163 |
| 5,582,928 A | 12/1996 | Farley | 320/150 |
| 5,585,710 A | 12/1996 | Nakamura et al. | 320/112 |
| 5,589,756 A | 12/1996 | Wilson et al. | 320/150 |
| 5,592,065 A | 1/1997 | Oglesbee et al. | 320/113 |
| 5,592,070 A | 1/1997 | Mino | 320/163 |
| 5,602,454 A | 2/1997 | Arakawa et al. | 320/106 |
| 5,602,460 A | 2/1997 | Fernandez et al. | 320/152 |
| 5,604,419 A | 2/1997 | Bisschop et al. | 320/150 |
| 5,608,304 A | 3/1997 | Okumura | 320/134 |
| 5,617,004 A | 4/1997 | Kaneko | 320/119 |
| 5,621,302 A | 4/1997 | Shinohara | 320/148 |
| 5,623,196 A | 4/1997 | Fernandez et al. | 320/153 |
| 5,626,979 A | 5/1997 | Mitsui et al. | 429/97 |
| 5,627,452 A | 5/1997 | Okada | 320/148 |
| 5,635,820 A | 6/1997 | Park | 320/148 |
| 5,637,979 A | 6/1997 | Tamai et al. | 320/116 |
| 5,642,028 A | 6/1997 | Tai et al. | 320/111 |
| 5,644,208 A | 7/1997 | Abiven | 320/118 |
| 5,652,499 A | 7/1997 | Morita et al. | 320/112 |
| 5,652,500 A | 7/1997 | Kadouchi et al. | 320/150 |
| 5,661,392 A | 8/1997 | Imazeki | 320/106 |
| 5,668,462 A | 9/1997 | Hansson et al. | 320/110 |
| 5,672,441 A | 9/1997 | Aoki et al. | 429/97 |
| 5,686,810 A | 11/1997 | Yasui | 320/113 |
| 5,686,815 A | 11/1997 | Reipur et al. | 320/116 |
| 5,689,173 A | 11/1997 | Oosaki et al. | 320/154 |
| 5,691,624 A | 11/1997 | Im et al. | 320/148 |
| 5,698,966 A | 12/1997 | Chen | 320/154 |
| 5,708,348 A | 1/1998 | Frey et al. | 320/145 |
| 5,708,350 A | 1/1998 | Tibbs | 320/153 |
| 5,714,868 A | 2/1998 | Uchida et al. | 320/150 |
| 5,717,313 A | 2/1998 | Grabon | 320/150 |
| 5,717,314 A | 2/1998 | Wakefield | 320/150 |
| 5,723,971 A | 3/1998 | Sakai et al. | 320/106 |
| 5,731,666 A | 3/1998 | Malhi | 320/154 |
| 5,736,834 A | 4/1998 | Kuno | 320/146 |
| 5,739,671 A | 4/1998 | Hamada | 320/149 |
| 5,744,939 A | 4/1998 | Leppo | 320/153 |
| 5,747,966 A | 5/1998 | Minamoto | 320/126 |
| 5,751,136 A | 5/1998 | Takechi et al. | 320/150 |
| 5,754,027 A | 5/1998 | Oglesbee et al. | 320/122 |
| 6,023,146 A | 5/1998 | Casale et al. | 320/112 |
| 5,767,659 A | 6/1998 | Farley | 320/150 |
| 5,773,959 A | 6/1998 | Merritt et al. | 320/120 |
| 5,793,186 A | 8/1998 | Watabe et al. | 320/112 |
| 5,795,664 A | 8/1998 | Kelly | 429/7 |
| 5,796,238 A | 8/1998 | Hiratsuka et al. | 320/112 |
| 5,818,204 A | 10/1998 | Banyas et al. | 320/150 |
| 5,821,733 A | 10/1998 | Turnbull | 320/116 |
| 5,821,736 A | 10/1998 | Yeon | 320/148 |
| 5,825,159 A | 10/1998 | Patino | 320/125 |
| 5,828,203 A | 10/1998 | Lindeboom et al. | 320/150 |
| 5,831,415 A | 11/1998 | Rudolph et al. | 320/112 |
| 5,844,401 A | 12/1998 | Lee | 320/107 |
| 5,847,539 A | 12/1998 | Akiya | 320/106 |
| 5,847,542 A | 12/1998 | Ichihara | 320/119 |
| 5,852,549 A | 12/1998 | Heeringa | 320/130 |
| 5,853,915 A | 12/1998 | Suto | 429/100 |
| 5,854,549 A | 12/1998 | Paulick | 320/110 |
| 5,856,737 A | 1/1999 | Miller et al. | 320/152 |
| 5,864,220 A | 1/1999 | Reipur et al. | 320/134 |
| 5,864,224 A | 1/1999 | Takechi et al. | 320/152 |
| 5,872,444 A | 2/1999 | Nagano et al. | 320/106 |
| 5,874,825 A | 2/1999 | Brotto | 320/150 |
| D407,064 S | 3/1999 | Lebherz | D13/108 |
| D408,784 S | 4/1999 | Maeyama | D13/103 |
| 5,900,717 A | 5/1999 | Lee | 320/150 |
| 5,900,718 A | 5/1999 | Tsenter | 320/151 |
| 5,900,719 A | 5/1999 | Iimura | 320/154 |
| 5,903,764 A | 5/1999 | Shyr et al. | 320/106 |
| 5,905,632 A | 5/1999 | Seto et al. | 361/683 |
| 5,909,101 A | 6/1999 | Matsumoto et al. | 320/110 |
| 5,939,859 A | 8/1999 | Morita | 320/112 |
| 5,945,235 A | 8/1999 | Clanton et al. | 429/98 |
| 5,945,803 A | 8/1999 | Brotto et al. | 320/106 |
| 5,945,812 A | 8/1999 | Choi | 320/150 |
| 5,969,506 A | 10/1999 | Neal | 320/125 |
| 5,973,478 A | 10/1999 | Keating et al. | 320/125 |
| 5,973,479 A | 10/1999 | Pomo et al. | 320/150 |
| D417,187 S | 11/1999 | Maeyama | D13/103 |
| D417,188 S | 11/1999 | Maeyama | D13/103 |

| | | | |
|---|---|---|---|
| 5,994,879 A | 11/1999 | Hsieh | 320/134 |
| D417,860 S | 12/1999 | Lau | D13/103 |
| D417,861 S | 12/1999 | Maeyama | D13/103 |
| 6,004,689 A | 12/1999 | Walker et al. | 429/53 |
| 6,008,628 A | 12/1999 | Brotto | 320/137 |
| 6,011,380 A | 1/2000 | Paryani et al. | 320/132 |
| 6,016,047 A | 1/2000 | Notten et al. | 320/137 |
| 6,016,048 A | 1/2000 | Davidson | 320/153 |
| 6,020,721 A | 2/2000 | Brotto | 320/150 |
| 6,037,747 A | 3/2000 | Chalasani et al. | 320/125 |
| 6,057,050 A | 5/2000 | Parise | 429/7 |
| 6,075,342 A | 6/2000 | Koenck | 320/153 |
| 6,075,347 A | 6/2000 | Sakakibara | 320/150 |
| 6,091,224 A | 7/2000 | Morita | 320/113 |
| 6,107,782 A | 8/2000 | Imai et al. | 320/150 |
| 6,107,802 A | 8/2000 | Matthews et al. | 320/134 |
| 6,111,389 A | 8/2000 | Aranovich et al. | 320/150 |
| 6,112,414 A | 9/2000 | Andis et al. | 320/115 |
| 6,117,575 A | 9/2000 | Dinsdale | 429/1 |
| 6,118,250 A | 9/2000 | Hutchison, IV et al. | 320/110 |
| 6,118,254 A | 9/2000 | Faulk | 320/141 |
| 6,118,255 A | 9/2000 | Nagai et al. | 320/152 |
| 6,124,699 A | 9/2000 | Suzuki et al. | 320/110 |
| 6,127,802 A | 10/2000 | Lloyd et al. | 320/113 |
| 6,275,011 B1 * | 8/2001 | Yang | 320/150 |

* cited by examiner

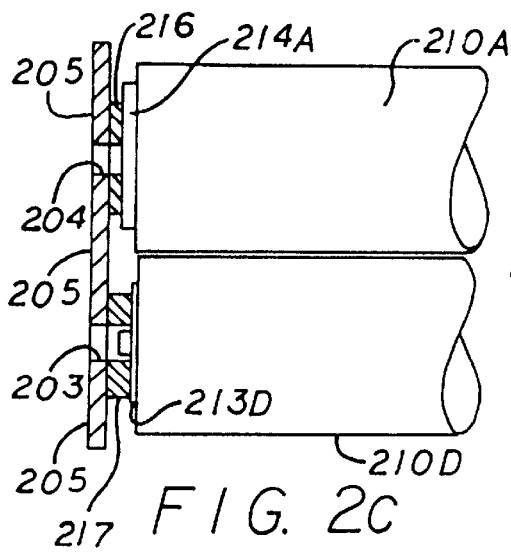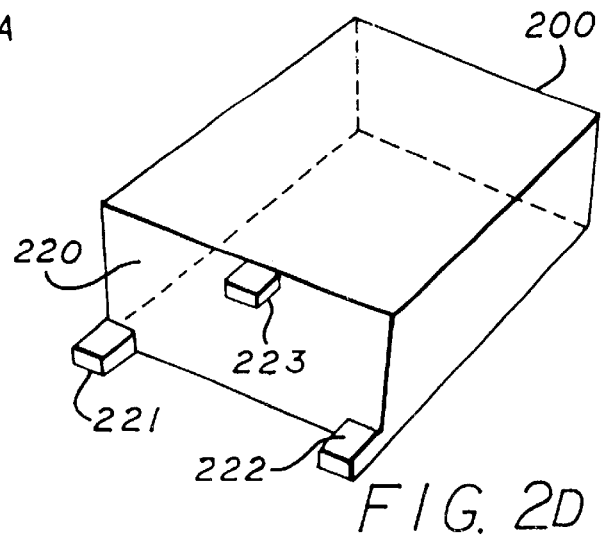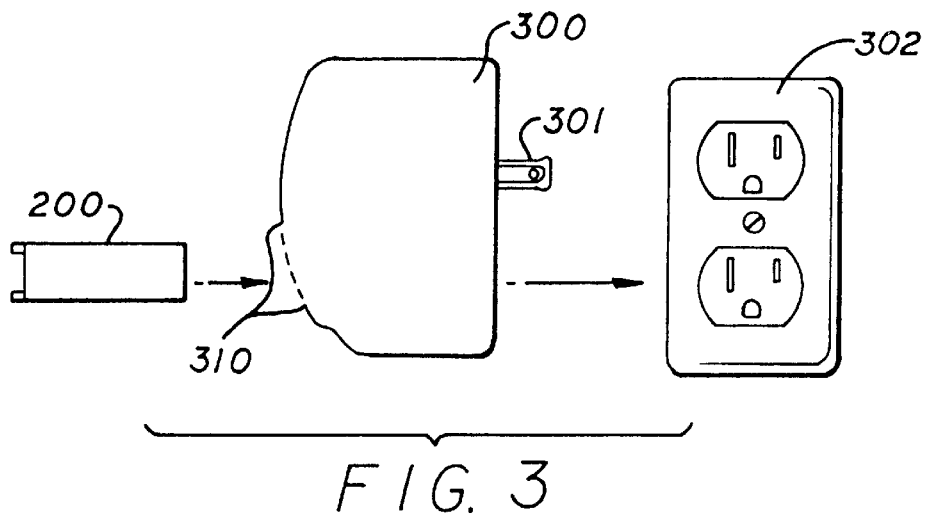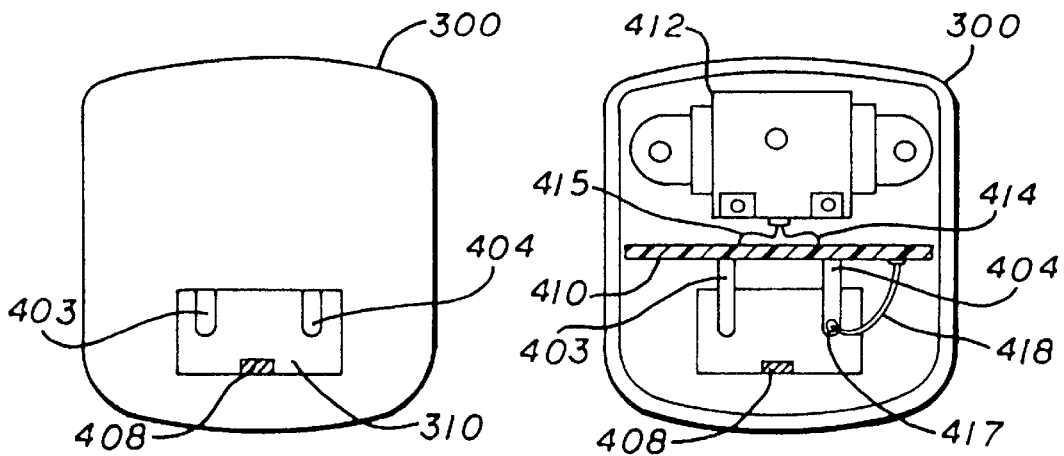

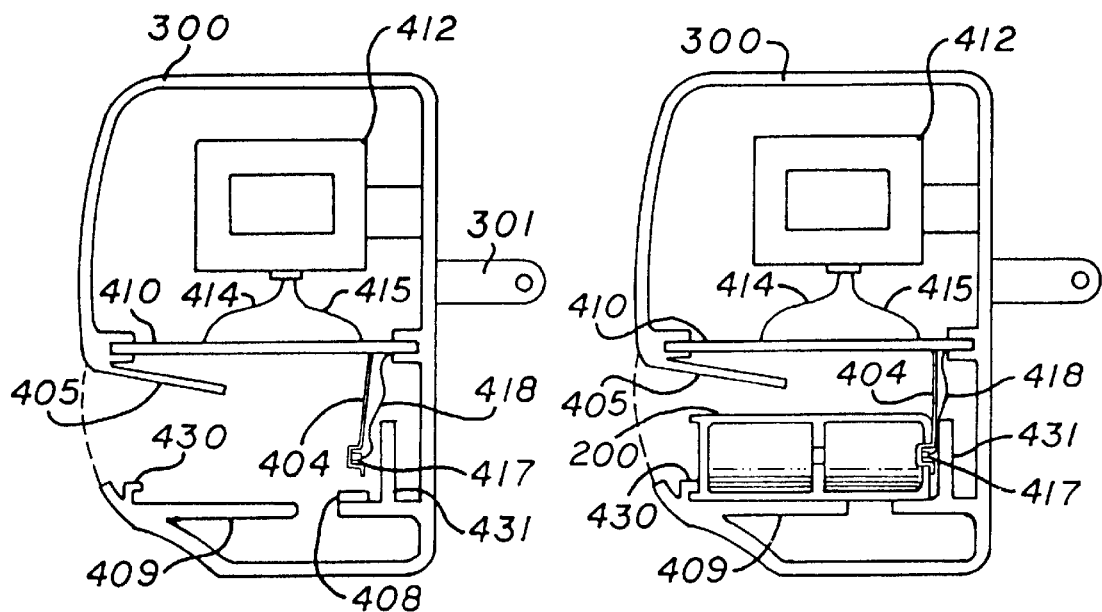
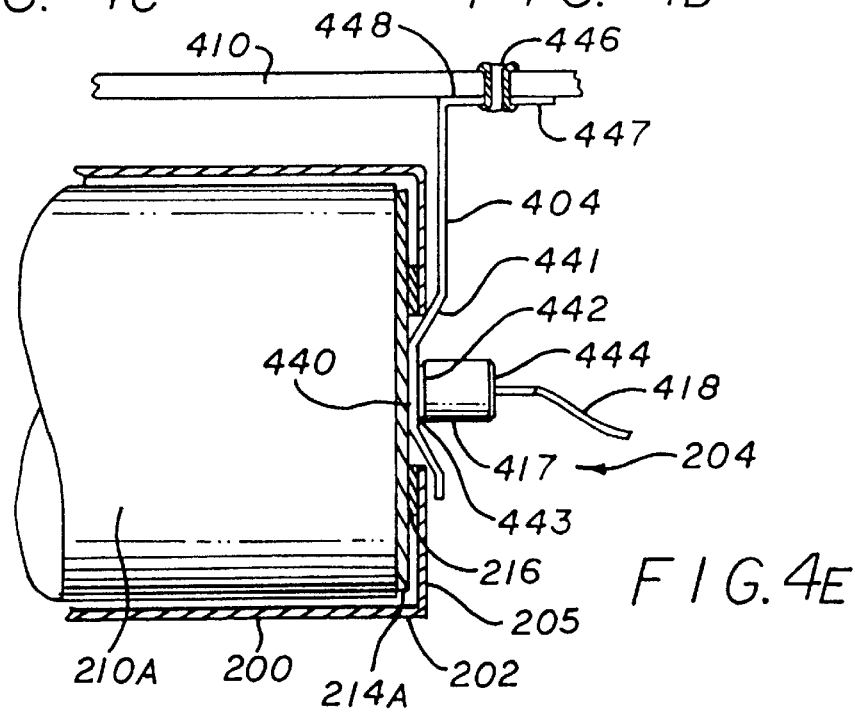
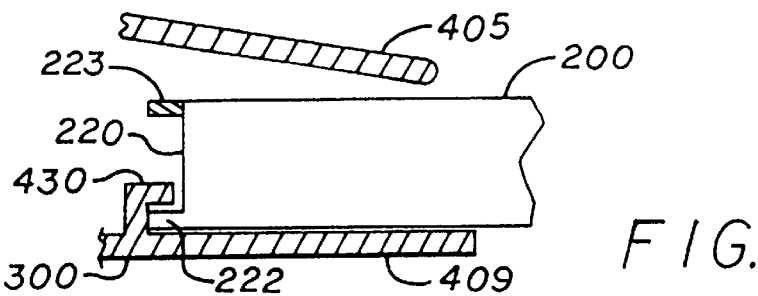

METHODS AND APPARATUSES FOR RECHARGEABLE BATTERY PACK CHARGERS

CROSS-REFERENCE TO RELATED APPLICATION

This non-provisional U.S. patent application filed by inventors Small et al claims the benefit and is a continuation of U.S. patent application Ser. No. 09/417,342, filed on Oct. 13, 1999, now U.S. Pat. No. 6,326,767, which claims the benefit of U.S. Provisional Patent Application No. 60/127,168 filed on Mar. 30, 1999 by inventor David Small.

FIELD OF THE INVENTION

This invention relates to battery charging systems and more particularly to battery chargers and rechargeable battery packs.

BACKGROUND OF THE INVENTION

Rechargeable batteries are well known in the prior art. Rechargeable batteries are capable of being charged prior to initial use and recharged after being discharged. Generally, rechargeable batteries are charged by a battery charger having a power supply that can provide a supply of DC current. A rechargeable battery accepts the electrical current and converts it into chemical energy. As long as the rechargeable battery is capable of converting the electrical current into chemical energy, the rechargeable battery will not significantly rise in temperature. When a rechargeable battery is at full capacity, it is incapable of converting the charge current into chemical energy and it dissipates any continuing charge current as heat. The heat generated by a rechargeable battery is an ideal parameter to sense that it has reached a fully charged state.

A typical low-cost battery charger provides a charging current that is a relatively low current to a rechargeable battery such that it can be sustained indefinitely without damaging the battery. This low current, typically between 25 milliamps and 100 milliamps, will safely charge a battery from a discharged state to a fully charged state in approximately 4 to 12 hours. This low current provided by the low cost battery charger is sometimes referred to as a trickle charge. The trickle charge current can be set to a level where the battery can safely dissipate excess current into heat without overheating the battery. Generation of excessive heat in a rechargeable battery will cause it to breakdown and reduce its useful lifetime. A disadvantage to using a low current and low cost battery charger is that it requires charging a battery for a relatively long period of time in order to reach a fully recharged state. Using certain precautions, rechargeable batteries can be charged at a faster rate using higher charging currents.

A rechargeable battery can be charged at higher rates provided that safety precautions are taken to prevent overheating of the battery thereby preventing a possible fire, injury to a user, or damage to the battery or the battery charger. Preventing injury to a user is particularly important when a charging system is utilized by children to recharge batteries that are utilized in toys. Additionally, as new fast charge technology is applied to rechargeable batteries for use within toys, safety precautions become very important as a result. A battery charger should assure that a rechargeable battery is not charged at an excessively high rate and that the charging current is removed or reduced, such as to a trickle charge rate, shortly after the battery reaches its fully charged state. The charge rate refers to the level of charge current and the time to recharge a discharged battery. A charge rate is excessive if it exceeds the rate at which a rechargeable battery can convert the charge current into chemical energy. This occurs when the charging current level is higher than the maximum charge current rated for a given battery type and capacity. For example, a typical 50 milliamp-hour Nickel-Cadmium (NiCad) battery can safely be charged up to a charging current level of 200 milliamps while a 700 milliamp-hour NiCad battery can be safely charged up to a charging current level of 2.8 amps. Typically, NiCad battery construction will allow for a battery cell to be recharged at four to ten times its hour rating of battery capacity. Battery manufacturing techniques vary from manufacturer to manufacturer as well as from cell type to cell type which dictates the maximum charge rate for each cell. If the charge rate is excessive, the battery produces heat to dissipate the energy provided by the excessive charge current level. Regardless of the charge current level, when a battery reaches its fully charged state it is no longer capable of converting the charge current into chemical energy. In this case, the battery dissipates the extra charge current as heat and the current should be removed or reduced such as to a trickle charge current in order to avoid damage, maintain battery life, and protect persons and property from harm.

There are a number of types of battery chargers available that will provide for higher rates of charging. These battery chargers are referred to as high-speed chargers or fast chargers. A number of these fast chargers attempt to automatically detect the battery capacity and set an appropriate charge current level. However, fast chargers which attempt automatic detection of battery capacity usually never charge at their fastest charge rate. Instead, because there are so many batteries of varying types from different battery manufacturers having different specifications, typically the lowest battery specification is used to avoid damage. Other fast chargers require that an operator manually select the proper charge current level for the battery that is to be charged. Typically these manually set fast charges allow a charge rate and charge time to be set at the discretion of the operator. An operator can inadvertently set the battery charging parameters to dangerous levels which could result in damage to the battery charging equipment or the operator or others nearby. Others battery chargers are dedicated to a single battery type and capacity with the battery charger designed to supply current levels required for the single battery type. These dedicated chargers typically have a charge rate set to recharge a rechargeable battery outside of an hour or more. The foregoing charge current levels may include a maximum level for a fast charge and other lower levels such as a trickle charge current level for slow charge. To avoid charging a battery after having reached its fully charged state, a number of methods may be employed to provide automatic charge shut-off.

The reader is referred now to FIG. 1 illustrating a cutaway perspective view of a prior art rechargeable battery pack 100. Rechargeable battery pack 100 includes a number of rechargeable batteries 101 coupled in series to generate increased electrical capacity over that of a single rechargeable battery. Typically battery cells are coupled in series to attain the appropriate voltage level for the application. Each rechargeable battery 100 has a positive terminal and a negative terminal. In coupling the battery in series, the positive terminal of the first battery is coupled to the negative terminal of the second battery and the positive terminal of the second battery is coupled to the negative terminal of the third battery and so on. A connecting wire 103 is coupled to the negative terminal of the first battery in the series at one end and the negative battery pack contact 105 at its other end. A connecting wire 104 is coupled to the positive terminal of the last battery in the series at one end and the positive battery pack contact 106 at its other end. In some instances, a battery pack 100 may include a thermistor 110 within the battery pack housing 102 for sensing the temperature of the batteries. The resistance value of this thermistor is representative of the heat generated during a recharging process. The battery pack 100 includes the sensor contacts 115 and 116 that connect to the thermistor 110 by connecting wires 117–118 respectively.

Prior art methods of providing automatic shut off usually evaluate the rate of change in battery voltage over time (–delta V/delta time) or by evaluating the rate of change in battery temperature over time (delta T/delta time) and compare it with battery specifications. The battery temperature in prior art battery packs 100 is measured by the included thermistor 110. The measurement of temperature provided by the thermistor 110 is signaled to a battery charger through the wires 117–118 and sensor contacts 115–116. This type of battery charger will typically include a microprocessor to evaluate the rate of change in battery voltage over time or the rate of change in battery temperature over time to provide atomic shutoff. A microprocessor is particularly useful when multiple battery specifications need to be compared in a battery charger designed to charge a wide array of battery types and capacities. However, in charging systems that rely on the microprocessor to provide automatic shutoff, it is possible for a program error, power glitch, or other malfunction to cause the microprocessor to bomb or freeze. When the microprocessor bombs or freezes, often times the battery charger continues to charge a rechargeable battery without the automatic shutoff feature provided by the microprocessor. If this were to happen to the microprocessor, an accident may occur. It is also possible in chargers designed with a microprocessor to have manual input of charge rates and times. Manually inputting charging rates and charge times can result in batteries being overcharged, resulting in battery damage, charger damage or operator injury. It is desirable to provide added safety features to a battery charging system in order to avoid injury to persons and property.

In order to provide a measure of battery temperature, thermistor 110 is usually manufactured as part of the rechargeable battery pack. Including a thermistor in the manufacture of the rechargeable battery pack adds considerable expense. Thus, it is desirable to eliminate the thermistor in the rechargeable battery pack while maintaining a means for measuring the battery temperature for the purpose of automatic charge shut-off. One prior art means of removing the thermistor from the rechargeable battery pack is provided by U.S. Pat No. 4,616,171 entitled "Battery Charger Including Thermistor" which issued Oct. 7, 1986 to Jean Hernandez and Alain Verdier ("Hernandez"). In the Hernandez patent, a thermistor, "Ther", is provided within a battery charger. In Hernandez, the battery charger casing 121 requires a side. opening 120 and the battery pack housing 202 requires a side recess or cutout to allow the thermistor to couple to the rechargeable battery pack 200 inserted into the battery charger. Hernandez requires that a contact plate 100 of the thermistor mechanically and electrically couple to the electrically conductive casing 206 of an end battery cell 204 through the side recess or cutout 212. In Hernandez, the contact plate 100 and the thermistor are supported by supporting wings 57 which are mechanically deformed to allow pivoting and proper coupling when a rechargeable battery pack is inserted. Without contact being established between the thermistor Ther and the selected battery cell of the rechargeable battery pack, the thermistor remains electrically unconnected in Hernandez. If a faulty connection between the thermistor and the rechargeable battery pack is detected, the battery charger prevents the rechargeable battery pack from being charged. The Hernandez charging circuit has only one thermistor. While it is desirable to reduce the number of thermistors, one thermistor may only sense battery temperature while ambient temperature may be ignored. Furthermore, the battery charger of Hernandez patent provides only one level of charge rate of a rechargeable battery pack. Referring to FIGS. 5–6 of Hernandez, the casing 201 of the rechargeable battery pack 200 includes contact strips 211 to which end terminals of the end battery cells 204 couple on one side while the terminals 5 and 6 of the battery charger couple on an opposite side so that end terminals of the rechargeable batteries cells in a rechargeable battery pack do not directly couple to the battery charger.

A disadvantage to the battery charger of Hernandez is that mechanical components that allow pivoting may become damaged or break and not allow proper coupling of the thermistor to a rechargeable battery pack such that the battery charger would not function. It is desirable to reduce the number of mechanical components in a battery charger at the thermistor connection to improve reliability of a battery charger.

A further disadvantage to the battery charger of Hernandez is that the addition of casing cutouts and mechanical components to include the thermistor in the battery charger increases manufacturing costs. It is desirable to provide a lower cost battery charger having a thermistor for sensing temperature to provide an automatic shutoff.

Another disadvantage to the rechargeable battery pack of Hernandez and other prior art rechargeable battery packs is that the rechargeable battery pack includes extra contact strips and or wires to couple between the battery terminals of the batteries and the battery charger terminals. It is desirable to reduce the connectors between the battery terminals and the battery charger in a rechargeable battery pack to lower the cost of manufacturing a rechargeable battery pack and to improve the charging performance provided to a rechargeable battery pack by a battery charger.

Another disadvantage to Hernandez and other charging systems is that marginal safety features are provided to assure automatic charge shutoff when a rechargeable battery pack has reached its fully charged state. It is desirable to provide a new battery charging system having redundant safety features.

BRIEF SUMMARY OF THE INVENTION

The present invention includes the methods, systems and apparatus as described in the claims. Briefly, a battery charging system for a rechargeable battery pack is disclosed. The rechargeable battery pack and the battery charger are mechanically and electrically coupled together in order to charge the rechargeable battery pack. The battery charger has a fast charge rate and a trickle charge rate. The battery charger includes a thermal sensing means at its negative charging terminal to directly sense the temperature at the pole of the negative terminal of a battery cell in the rechargeable battery pack to determine when to automatically cutoff charging at the fast charge rate and charge thereafter at the trickle charge rate. The rechargeable battery pack has openings that allow the battery charger terminals to directly couple at the poles of the battery terminals of the end batteries for more accurate temperature sensing. The battery charging system provides for a quick load system to more easily lock the rechargeable battery pack into the battery charger. The battery charger has a receiving hook to couple to locking tabs of the rechargeable battery pack to prevent it from being dislodged by movement of the battery charger. The rechargeable battery pack includes a polarity slot in its case to mate with a polarity key in the battery charger to avoid improper installation.

The charging control system of the battery charger provides for redundant safety systems which are independent from microcontroller control in order to provide independent automatic shut off of the fast charge rate. One independent safety system provides that an inserted rechargeable battery pack is charged at a fast charge rate only when its voltage measures within a chargeable voltage range. If the voltage of the rechargeable battery pack is outside the chargeable voltage range then the battery charger charges at the trickle charge rate in order to avoid harming persons or damage property including the battery under charge and the charging system. An additional independent safety system provides that an inserted rechargeable battery pack is charged at a fast charge rate only when its battery temperature measures within a safe chargeable temperature range. These independent safety systems provides redundancy to that provided by the microprocessor such that if the microprocessor is frozen or non-functional, they will keep the battery charging system operational over a safe range.

Normally, the charging system is controlled by the microcontroller within the boundaries of the independent safety system. The microcontroller determines an indication of temperature of an inserted rechargeable battery pack and using a timer determines the rate of change of battery temperature. If the rate of change in battery temperature is at an acceptable level and within the set of battery parameters, the battery charger can fast charge the rechargeable battery pack. If the rate of change in battery temperature when charged at a fast charge rate is at an unacceptable level, the rechargeable battery pack is charged at the trickle charge rate. LED indicators provided by the battery charger are illuminated in various ways to indicate to a user whether or not the battery charger is properly charging and whether a charging cycle has been completed.

BRIEF DESCRIPTIONS OF THE DRAWINGS

FIG. 2C is a cross-sectional view from the top of the rechargeable battery pack of FIG. 2A.

FIG. 2D is a perspective view of the backside of the rechargeable battery pack of FIG. 2A as viewed from the top.

FIG. 3 is a diagram illustrating the battery charging system of the present invention.

FIG. 4A is a front view of the battery charger of the present invention.

FIG. 4B is a front cutaway view of the battery charger of FIG. 4A.

FIG. 4C is a right side cross-sectional view of the battery charger of FIG. 4A.

FIG. 4D is a right side cross-sectional view of the battery charging system of the present invention with the rechargeable battery pack of FIG. 2A coupled to the battery charger of FIG. 4A.

FIG. 4E is a magnified cross-sectional view of the thermal, electrical and mechanical coupling between an end battery within the rechargeable battery pack of FIG. 2A and the battery charger of FIG. 4A.

FIG. 4F is a magnified cross-sectional view of the mechanical coupling between the rechargeable battery pack of FIG. 2A and the battery charger of FIG. 4A.

DETAILED DESCRIPTION OF THE PREFERRED EMBODIMENT

Figure 1:
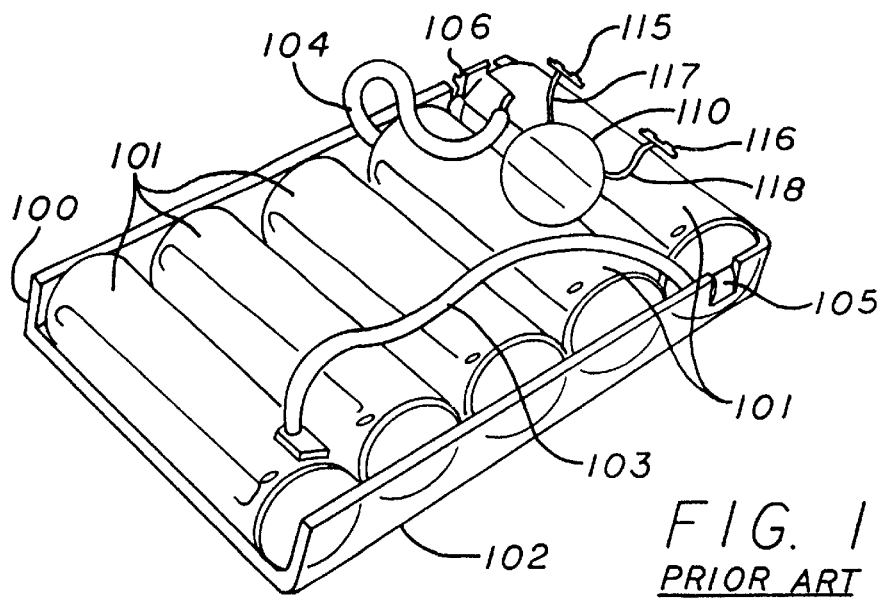
FIG. 1 is a perspective cutaway view of a prior art rechargeable battery pack.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Briefly, the present invention includes a system, method and apparatus for charging rechargeable battery packs. The rechargeable battery pack and the battery charger are mechanically and electrically coupled together in order to charge the rechargeable battery pack. The battery charger has a fast charge rate and a trickle charge rate. The battery charger includes a thermal sensing means at its negative charging terminal to directly sense the temperature at the pole of the negative terminal of a battery cell in the rechargeable battery pack to determine when to automatically cutoff charging at the fast charge rate and charge thereafter at the trickle charge rate. The rechargeable battery pack has openings that allow the battery charger terminals to directly couple at the poles of the battery terminals of the end batteries for more accurate temperature sensing. The battery charging system provides for a quick load system to more easily lock the rechargeable battery pack into the battery charger. The battery charger has a receiving hook to couple to locking tabs of the rechargeable battery pack to prevent it from being dislodged by movement of the battery charger. The rechargeable battery pack includes a polarity slot in its case to mate with a polarity key in the battery charger to avoid improper installation.

The charging control system of the battery charger provides for redundant safety systems which are independent from microcontroller control in order to provide independent automatic shut off of the fast charge rate. One independent safety system provides that an inserted rechargeable battery pack is charged at a fast charge rate only when its voltage measures within a chargeable voltage range. If the voltage of the rechargeable battery pack is outside the chargeable voltage range then the battery charger charges at the trickle charge rate in order to avoid harming persons or damage property including the battery under charge and the charging system. An additional independent safety system provides that an inserted rechargeable battery pack is charged at a fast charge rate only when its battery temperature measures within a safe chargeable temperature range. These independent safety systems provides redundancy to that provided by the microprocessor such that if the microprocessor is frozen or nonfunctional, they will keep the battery charging system operational over a safe range.

Normally, the charging system is controlled by the microcontroller within the boundaries of the independent safety system. The microcontroller determines an indication of temperature of an inserted rechargeable battery pack and using a timer determines the rate of change of battery temperature. If the rate of change in battery temperature is at an acceptable level and within the set of battery parameters, the battery charger can fast charge the rechargeable battery pack. If the rate of change in battery temperature when charged at a fast charge rate is at an unacceptable level, the rechargeable battery pack is charged at the trickle charge rate. LED indicators provided by the battery charger are illuminated in various ways to indicate to a user whether or not the battery charger is properly charging and whether a charging cycle has been completed.

Reference is now made to FIGS. 2A–2D illustrating the rechargeable battery pack 200 of the present invention. Rechargeable battery pack 200 includes a battery pack housing 202 having a positive terminal opening 203 and a negative terminal opening 204 in a front side 205. The bottom side 206 of the battery case 202 includes a reverse polarity protection slot 208. The reverse polarity protection slot 208 protects the rechargeable battery pack from being inserted improperly into a battery charger. Battery pack housing 202 is preferably plastic. Inside the rechargeable battery pack 200 are a plurality of batteries 210A through 210D. Batteries 210A through 210D are commonly referred to herein as batteries 210. Batteries 210 of the preferred embodiment are nickel-cadmium batteries. They also may be lithium-ion, nickel metal hydride or other rechargeable type of battery. Battery 210A through battery 210D are coupled in series together. Battery 210A has a negative terminal 214A with its polar area exposed to the exterior of the rechargeable battery pack 200 by negative terminal opening 204. Battery 210D has a positive terminal 213D with its polar area exposed to the exterior of the rechargeable battery pack by positive terminal opening 203. The polar area or pole is an area of a terminal near the center axis of the battery. Negative terminals 214B–214D and positive terminals 213A–213C are not viewed in FIG. 2A. The positive terminal 213A of battery 210A is coupled to the negative terminal 214B of battery 210B. The positive terminal 213B of battery 210B is coupled to negative terminal 214C of battery 210C by shorting strip 212. Shorting strip 212 is a conductive strip that is preferably metallic. The positive terminal 213C of battery 210C is coupled to the negative terminal 214D of battery 210D.

Figure 2A:
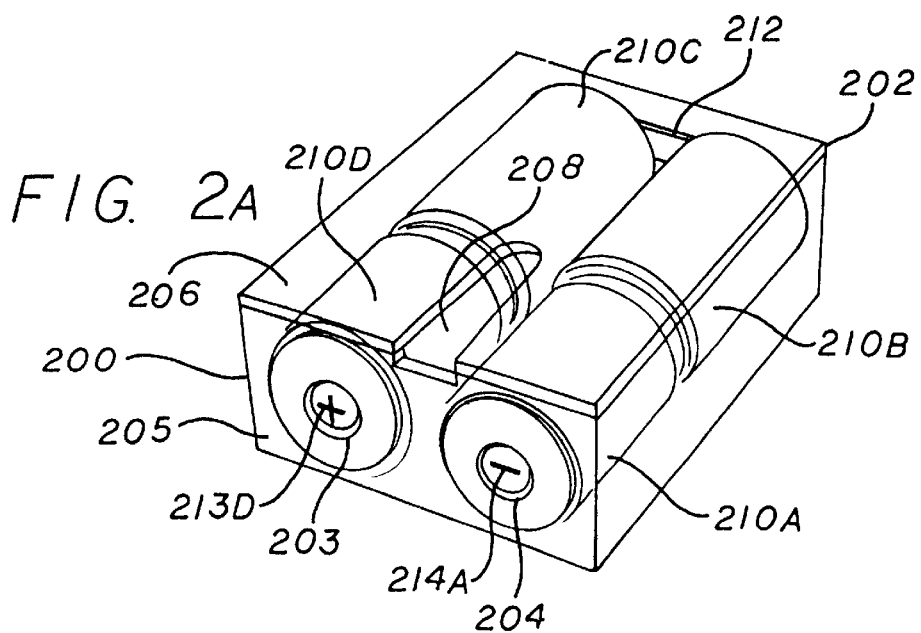
FIG. 2A is a perspective cutaway view from the bottom of the rechargeable battery pack of the present invention which couples to the battery charger of the present invention.
Figure 2B:
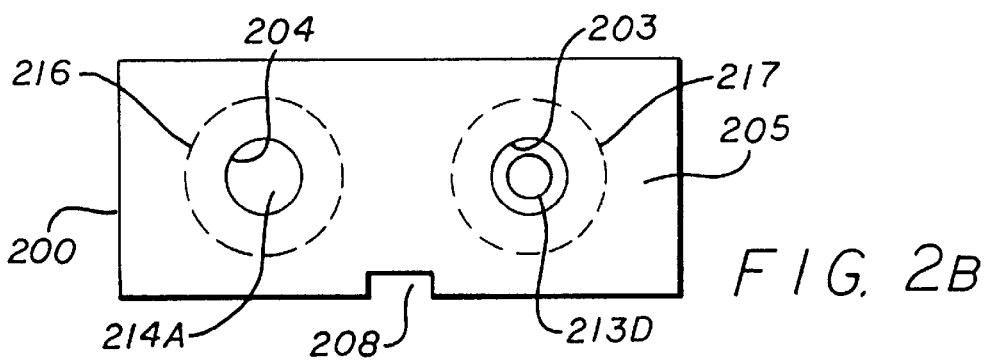
FIG. 2B is a front view of the rechargeable battery pack of FIG. 2A.

FIG. 2B illustrates the front side 205 of the rechargeable battery pack 200. The polar area of positive battery terminal 213D of battery 210D is visible through opening 203. The polar area of negative battery terminal 214A of battery 210A is visible through opening 204. Opening 203 and 204 are circular holes in the front side 205 of housing 202 of the rechargeable battery pack 200 for exposing the poles of the terminals of the end batteries 210A and 210D for coupling to the charging terminals of a battery charger. To protect the openings from the environment, sealing washer 216 and sealing washer 217 are included in the rechargeable battery pack 200.

FIG. 2C illustrates a cross-section of the top view of the rechargeable battery pack 200. Sealing washer 216 is fitted between the front side 205 of the battery pack housing 202 and the polar area of negative terminal 214A of battery 210A. Sealing washer 217 is fitted between the front side 205 of the battery.pack housing 202 and the polar area of positive battery terminal 213D of battery 210D. Sealing washers 216–217 have center holes that coincide with openings 204 and 203 respectively. The center holes of the sealing washers 216–217 also expose the poles of the terminals of the end batteries 210A and 210D for coupling to the charging terminals of a battery charger.

FIG. 2D illustrates a perspective view of a backside 220 of rechargeable battery pack 200 from a top view. The backside 220 includes a finger grip tab 223 located near the middle of the top edge of the backside 220 and a pair of locking tabs 221–222 located near the bottom corners of the backside 220 to provide a quick-load system for the rechargeable battery pack 200. The locking tabs 221–222 are provided to lock rechargeable battery pack 200 to a battery charger. Finger grip tab 223 is provided to remove rechargeable battery pack 200 from its locked position and decouple it from the battery charger.

Reference is now made to FIG. 3 illustrating the battery charging system of the present invention. Battery charging system includes the rechargeable battery pack 200 and a battery charger 300. Battery charger 300 includes a pair of AC power spades 301 directly attached to it for coupling the battery charger 300 into an AC outlet 302. Battery charger 300 includes an opening 310 into which the rechargeable battery pack 200 may be inserted.

Reference is now made to FIGS. 4A–4F illustrating details of the battery charger 300 of the present invention. FIG. 4A illustrates a front view of the battery charger 300. Battery charger 300 includes a positive charging terminal 403, a negative charging terminal 404, and a reverse polarity protection key 408. The rechargeable battery pack 200 is inserted into the battery charger 300 through the opening 310.

FIG. 4B illustrates a front cutaway view of the battery charger 300. Battery charger 300 includes a printed circuit board (PCB) 410 having electronic circuitry and a transformer T1 coupled to the printed circuit board through wires 414 and 415. Positive charging terminal 403 and negative charging terminal 404 are coupled to the printed circuit board 410. Battery charger 300 includes a battery temperature thermistor 417 for sensing battery temperature. A thermistor is an electronic device that makes use of a change in the resistivity of a semiconductor to indicate change in temperature. The resistance of a thermistor varies as a function of temperature when heat is applied. Other electronic devices that can measure or sense temperature and vary resistance, current or voltage of the electronic device as a function of temperature may be substituted for the thermistor 417. The battery temperature thermistor 417 is electrically coupled to the printed circuit board 410 through the negative charging terminal 404 at one end and the wire 418 at another end.

FIG. 4C illustrates a right side cross-section of the battery charger 300. Positive charging terminal 403 and negative charging terminal 404 are spring-loaded forward to receive the rechargeable battery pack 200. Battery temperature thermistor 417 is coupled behind the contact point of negative charging terminal 404. The reverse polarity protection key 408 provides guidance and a stopping point for the rechargeable battery pack 200 when it is inserted into the battery charger 300. Alignment bar 405 provides guidance to the rechargeable battery pack 200 when inserted into the battery charger 300. Support pad 409 provides support to the rechargeable battery pack 200 when in the charger 300 to keep it properly aligned. Receiving hook 430 provides a locking mechanism for keeping the rechargeable battery pack 200 locked in place in the charger 300. Back stop 431 keeps the rechargeable battery pack from being pushed too far forward in order to avoid a user damaging the electrical charging terminals 403–404.

FIG. 4D is a right side cross-section of battery charger 300 with the rechargeable battery pack 200 inserted therein. Positive charging terminal 403 and negative charging terminal 404 are compressed forward when rechargeable battery pack 200 is inserted. Rechargeable battery pack 200 is retained in place within the battery charger 300 by the locking tabs 221–222 coupling to the receiving hook 430.

FIG. 4E illustrates the details of the coupling between the rechargeable battery pack 200 and the battery charger 300 at the negative charging terminal 404. Contact point 440 of the negative charging terminal 404 reaches through opening 204 to couple at the pole of the negative battery terminal 214A of battery 210A for electrical and thermal coupling. Battery temperature thermistor 417 is coupled to the backside of the negative charging terminal 404 at a dimple point 441. To provide thermal and electrical coupling to battery 210A within the rechargeable battery pack 200, thermistor electrode 442 is held coupled to the negative terminal 404 by solder 443 in the dimple point 441 across from the contact point 440. Wire 418 is soldered to the second thermistor electrode 444 of battery temperature thermistor 417. Heat at the pole of the negative terminal 214A of the battery 210A is conducted from the negative terminal 214A into the front side of negative charging terminal 404 at contact point 440 through to the back side of the negative charging terminal 404 and into the thermistor electrode 444 soldered to the backside of the negative charging terminal 404. Heat at the thermistor electrode conducts into the body of the thermistor 417 and causes its resistance to vary indicating a measure of battery temperature. The heat conducting materials between terminal 214A of the battery 201A and the thermistor 417 are preferably metallic in order to better conduct heat. A foot 447 of the Negative charging terminal 404 at an end opposite the contact point 440 is coupled to printed circuit board 410. A metallic rivet 446 electrically and mechanically couples the foot 447 of the negative charging terminal to a wire trace 448 on the printed circuit board 410. Similar coupling of the positive charging terminal 403 occurs at the pole of the positive battery terminal 213D of battery 210D within the rechargeable battery pack 200 excluding the coupling of a thermistor.

FIG. 4F illustrates a magnified side view of the rechargeable battery pack 200 coupling to battery charger 300. In the quick load system, the rechargeable battery pack 200 is locked in place within the battery charger 300 by locking tabs 221–222 coupling to the receiving hook 430 of the battery charger 300. The receiving hook extends the width of the rechargeable battery pack 200 to more easily couple with the locking tabs 221–222. The rechargeable battery pack 200 may be easily removed by a user by pushing in on the backside 220 against the spring tension provided by terminals 403–404 such that the locking tabs 221–222 clear the hook 430. The user can then push up on the rechargeable battery pack 200 at finger grip tab 223. Spring tension of the positive charging terminal 403 and the negative charging terminal 404 pushes out on the rechargeable battery pack 200 so that it may exit the battery charger 300 through, opening 310. A user may then grab the body of the rechargeable battery pack 200 that protrudes though opening 310 in order to completely remove it from the battery charger 300. To load, a user inserts the rechargeable battery pack 200 into the opening 310 in proper orientation such that the reverse polarity protection slot 208 is aligned with the reverse polarity protection key 408. Alignment bar 405 directs pack 200 down so that the reverse polarity protection slot 208 couples to the reverse polarity protection key 408 and the negative terminal 214A of battery 210A and positive terminal 210D of battery 201D respectively couple to the positive charging terminal 403 and the negative charging terminal 404 of the battery charger 300. A user further pushes in on the backside 220 of pack 200 such that the spring tension in the positive charging terminal 403 and the negative charging terminal 404 is compressed so much so that the locking tabs 221–222 clear the hook 430 and the bottom 206 of the pack 200 can substantially rest on the support pad 409. Back stop 431 prevents a user from pushing excessively in order to avoid damaging the positive charging terminal 403 and the negative charging terminal 404. A user releases the force exerted on the backside 220 of the pack 200 allowing the locking tabs 221–222 to couple to the receiving hook 430. No locking door is needed at opening 310 to lock the rechargeable battery pack 200 into place. The locking of the rechargeable battery pack 200 allows for battery charger 300 to be removed from an outlet 302 and moved around, turned upside down or shaken about without the rechargeable battery pack 200 falling out and becoming lost.

Figure 5A:
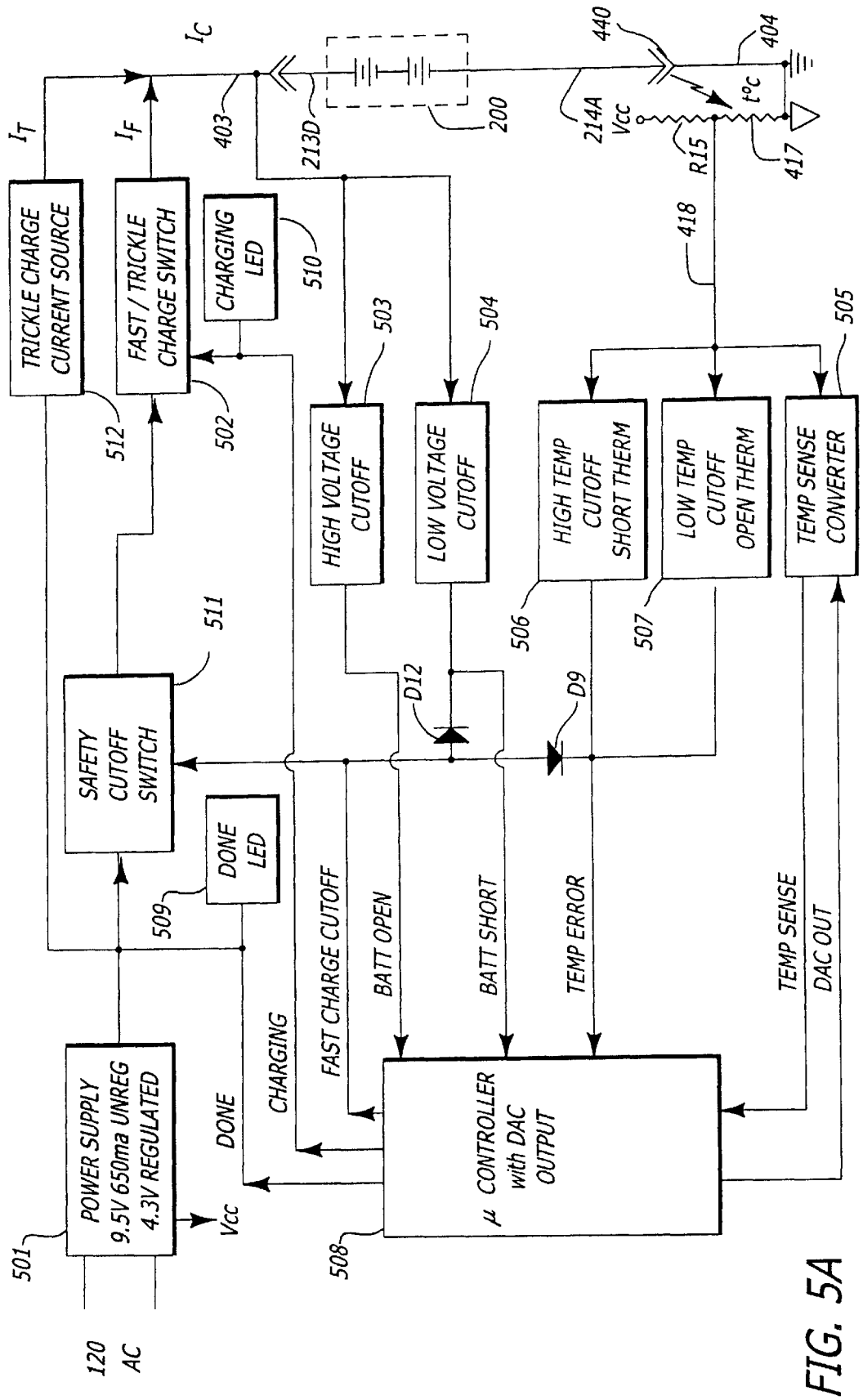
FIG. 5A is a block diagram of the battery charging system of FIG. 3.

Reference is now made to FIG. 5A illustrating a functional block diagram of the battery charging system including battery charger and rechargeable battery pack. The battery charging system includes a dual power supply 501, a fast/trickle charge switch 502, a high voltage cutoff 503, a low voltage cutoff 504, a temperature sense converter 505, a high temp cutoff 506, a low temp cutoff 507, a microcontroller 508, a "done" light-emitting diode (LED) 509, a "charging" LED 510, safety cutoff switch 511, trickle charge current regulator 512, pull-up resistor R15, battery temperature thermistor 417 to sense battery temperature, and a rechargeable battery pack 200. Battery temperature thermistor 417 is thermally coupled to the contact point 440 of the battery charger 300 so that its resistance varies as a function of changes in the heat or temperature of the negative terminal of a rechargeable battery within the rechargeable battery pack 200.

The dual power supply 501 couples to an AC outlet 302 in order to provide its dual power supply outputs of two DC voltages each having a DC current output. One of the dual power supply outputs supplies power to the electronic components of the battery charger while the other power supply output provides a DC voltage and a DC current for charging the rechargeable battery pack. For the electronic components in the battery charger, the dual power supply 501 preferably provides a regulated voltage of 4.5 volts DC. The power supply for the charging currents is preferably a non-regulated output of 9.5 volts at 650 milliamps under load and 12.5 volts under no load. The type of power supply used in the battery charger is dependent on the charge current. Preferably, the dual power supply 501 is a linear power supply providing for the charging currents. However, as charge currents increase for large capacity batteries, a switching power supply may be substituted for a linear supply.

The trickle charge current regulator 512 receives the charging current power supply and regulates its output current, trickle charge current $I_T$, down to a level of approximately ten milliamps. The trickle charge current $I_T$ is provided to the rechargeable batteries in the rechargeable battery pack 200 when it is inserted.

Fast/trickle charge switch 502 controls the selective coupling of the fast charging current into the rechargeable battery pack 200 in response to control signals received from the microcontroller 508. In order to do so, the fast/trickle charge switch 502 switches ON and OFF to selectively couple the fast charge current to the battery pack 200. If fast/trickle charge switch 502 is OFF, only a trickle charge current, $I_T$, may be supplied towards the battery pack 200 as the charging current, $I_C$, where $I_C = I_T$. If fast/trickle charge switch 502 is ON, a fast charge current, $I_F$, in conjunction with the trickle charge current, $I_T$, is supplied to the battery pack 200 as the charging current such that $I_C = I_T + I_F$. Preferably, the fast charge current is approximately six hundred milliamps while the trickle charge current is approximately ten milliamps.

The low voltage cutoff 504, high temp cutoff 506, and low temp cutoff 507 provide redundant safety features for the charging system over that provided by the microcontroller 508 alone. The battery charger 300 includes a high speed charging mode which uses a fast charge current (high current level per unit of time) to recharge a rechargeable battery or battery pack as do other battery chargers. The battery charger 300 has multiple safety features to avoid applying extremely fast charge current levels to a battery that is outside of nominal tolerances of voltage, internal impedance or temperature. This is to avoid any deterioration of the rechargeable battery pack, excessive high temperature of the rechargeable battery pack which could burn the operator if removed or explosion of the rechargeable battery pack causing personal injury or fire which could result if the fast charge current is not turned OFF at the right time. The low voltage cutoff 504, high temp cutoff 506, and low temp cutoff 507 providing these redundant safety features are independent such that if the microcontroller charging control fails or is in error for any reason, the battery charger can still safely operate using these components. The low voltage cutoff 504, high temp cutoff 506, and low temp cutoff 507 act in concert and independently of the microcontroller to turn off fast charging under certain conditions including if the battery gets too hot or cold or if the battery shorts out. The low voltage cutoff 504, high temp cutoff 506, and low temp cutoff 507 couple to the safety cutoff switch 511 through diodes D12 and D9. Diodes D12 and D9 provide an ORing function such that any of the low voltage cutoff 504, high temp cutoff 506, or low temp cutoff 507 can turn off the fast charge current. The safety cutoff switch 511 is in series with the fast/trickle charge switch 502 to provide for the redundant automatic shutoff of the fast charge current. If for some reason the fast/trickle charge switch 502 should fail into a fast charging state, the safety cutoff switch 511 in response to the low voltage cutoff 504, high temp cutoff 506, or low temp cutoff 507 can turn off the fast charging current. The microcontroller will also turn off the safety switch and the fast charge/trickle charge safety switch when it senses that a battery is over temperature or rising in temperature too fast.

A typical battery manufacturer specification suggest that a NiCad rechargeable battery should not be fast charged at temperatures above 45 degrees Celsius or below 10 degrees Celsius. Additionally, a completely drained NiCad rechargeable battery should be trickled charged (approximately less than 10 milliamps) up to approximately 0.825 Volts DC before applying any fast charging current. These values can be used to determine set points for the microcontroller and set points for the low voltage cutoff 504, high temp cutoff 506, and low temp cutoff 507. Observing these values in the battery charger system allows the rechargeable batteries to fall within the number of charge and discharge cycles specified by the battery manufacturer.

High temp cutoff 506 and low temp cutoff 507 limit the application of the fast charge current to rechargeable battery packs 200 having a battery temperature that ranges within a fast chargeable temperature range. This allows for a range of initially hot or cold batteries to be fast charged as well as setting a maximum safe battery temperature for a rechargeable battery undergoing fast charging. The set points for the high temp cutoff 506 and low temp cutoff 507 to turn off the fast charging current are preferably 50 degrees Celsius and 10 degrees Celsius respectively. For the microcontroller, the set points of the software program for temperature cutoff are preferably confined to a narrower fast charge operating range of 45 degrees Celsius as the high temperature cutoff and 10 degrees Celsius as the low temperature cutoff. Additionally, the high temp cutoff 506 senses if thermistor 417 is shorted out and maintains the battery charger in a trickle charge state if that is the case. If thermistor 417 is shorted out, the voltage on node 418 is grounded out. Low temp cutoff 507 additionally senses an open thermistor 417. If thermistor. 417 is open, the voltage on node 418 is pulled up to a high voltage level (VCC) through pull-up resistor R15.

High voltage cutoff 503 and low voltage cutoff 504 limit the fast charge current to rechargeable battery packs 200 having a battery pack voltage that ranges within a fast chargeable voltage range. Low voltage cutoff 504 protects against fast charging a rechargeable battery pack that is completely drained or has an internal shorted battery or a reversed polarity battery. A rechargeable battery pack 200 that is completely drained should be trickled charged up to approximately 0.825 VDC per battery cell, at which point the rechargeable battery pack 200 can be charged with the high or fast charge current provided by the fast charge mode. Theoretically, it is possible for a battery to reverse its polarity. A battery that is in this condition must be trickle charge to flip the battery potential to normal. The high voltage cutoff 503 protects against fast charging a battery pack having a high internal impedance (battery is damaged or worn and nearing the end of it's useful life) which is usually indicated by an excessive voltage level. If a rechargeable battery back has a voltage outside the fast chargeable voltage range, it is charged using the trickle charge current. The fast chargeable voltage range is set by the high voltage cutoff 503 detecting for a rechargeable battery pack exceeding a maximum chargeable voltage level and the low voltage cutoff 504 detecting for a rechargeable battery pack falling below a minimum chargeable voltage level. High voltage cutoff 503 senses the voltage of rechargeable battery pack 200 and compares it against the maximum chargeable voltage level. The low voltage cutoff 504 senses the voltage of the rechargeable battery pack 200 and compares it against the minimum chargeable voltage level. If the high voltage cutoff determines that the voltage of the rechargeable battery pack is above the maximum chargeable voltage level or if the low voltage cutoff 504 determines that the voltage of the rechargeable battery pack is below the minimum chargeable voltage level, either may signal to the microcontroller 508 to charge at a trickle rate and not a fast charge rate and cause the fast/trickle charge switch 502 to switch to the trickle charge mode and provide a trickle charge current to the rechargeable battery pack 200. A rechargeable battery pack having a voltage below the minimum chargeable voltage level may indicate a shorted or reversed battery cell therein or simply a completely discharged battery. A rechargeable battery pack having a voltage above the maximum chargeable voltage level indicates the battery is fully charged or that it has an unusually high impedance which may indicate a damaged or worn battery cell or rechargeable battery pack. The minimum chargeable voltage level for the preferred rechargeable battery pack of four NiCad batteries is 3.9 VDC. The 3.9 VDC was selected by adding 3.3 VDC (representing four times 0.825 VDC) with a 0.6 VDC margin. The 0.6 VDC margin distinguishes a discharged battery pack from a battery pack that is otherwise fully charged but having a single shorted cell. The maximum chargeable voltage level in the preferred embodiment is 6.8 VDC. High voltage, low voltage, high temperature, and low temperature are the first parameters detected by the battery charger when a battery pack is inserted. If a low voltage is detected in a rechargeable battery pack, the battery will be thereafter trickle charged until it reaches the threshold of 3.9 volts at which point fast charging will be initiated.

Additionally, high voltage cutoff 503 in conjunction with the microcontroller 508 detects insertion and removal of a rechargeable battery pack 200 from the battery charger 300. If an installed rechargeable battery pack 200 is removed from the battery charger 300, the high voltage cutoff 503 causes the fast/trickle charge switch 502 to go into a trickle charge mode in order to protect electronic circuitry and prepare for installation of a rechargeable battery pack 200. Assuming that a rechargeable battery pack 200 within the fast chargeable range is removed from the battery charger 300. The voltage of the power supply is then coupled to the positive charging terminal 403 because there is little current flow and voltage drop across the fast/trickle charge switch 502. The high voltage cutoff 503 determines that the voltage on the positive charging terminal 403 exceeds the maximum chargeable voltage and signals to the microcontroller 508 to go into a trickle charge mode.

While low voltage cutoff 504, high temp cutoff 506, and low temp cutoff 507 provide independent automatic shutoff of the fast charging state, ordinarily the charging operation is controlled by the microcontroller 508 within the boundaries set by these components. The high temp cutoff 506 and low temp cutoff 507 generate the signal TEMP ERROR which couples to the safety cutoff switch 511 and the microcontroller 508. The low voltage cutoff 504 generates the signal BATT SHORT which couples to the safety cutoff switch 511 and the microcontroller 508. The high voltage cutoff 503 generates The signal BATT OPEN which couples to the microcontroller 508. To control the charging operation, the microcontroller 508 includes a software program that generates output signals in response to input signals. The output signals from the microcontroller 508 include DONE, CHARGING, FAST CHARGE CUTTOFF, and DACOUT. The signal DONE indicates when a charging cycle is completed by turning ON the "done" LED 509. The signal CHARGING controls the switching of the fast/trickle charge switch 502 and causes the "charging" LED 510 to light up indicating a fast charge cycle. The signal FAST CHARGE CUTTOFF provides a second means of controlling the fast charging mode. The signal FAST CHARGE CUTTOFF is multiplexed with the outputs of the low voltage cutoff 504, high temp cutoff 506, and low temp cutoff 507 to provide the independent automatic charge shutoff. The microcontroller 508 includes an internal digital to analog converter (DAC) to generate an analog output level on DACOUT. The analog output level on DACOUT is an electrical reference level that is used to perform a comparison. The analog output level on DACOUT can vary from one comparison to the next. The DACOUT output from the microcontroller 508 is coupled to the temperature sense converter 505 for comparison with the analog level found on node 418 representing the heat or temperature sensed by the thermistor 417. The result of the comparison of the temperature sense converter 505 is provided back to the microcontroller 508 on the TEMP SENSE signal line. The software code of the microcontroller 508 includes an algorithm to determine the temperature of a rechargeable battery in the rechargeable battery pack. The algorithm determines a temperature for the rechargeable battery of the rechargeable battery pack by determining variations in TEMP SENSE in response to variations of DACOUT. The microcontroller 508 includes a timer which is utilized with the computed temperature to determine rates of temperature change which indicate the charge condition of the rechargeable battery pack.

Temperature sense converter 505 receives varying voltage levels related to battery temperature from the battery temperature thermistor 417 and compares the voltage levels with the voltage levels on DACOUT. The DAC output increments it's output voltage from a minimum voltage level to a maximum voltage level over thirty-two incremental voltage steps. For each incremental voltage step of the DAC output, the microcontroller checks the sense input. When the sense input goes high, the microcontroller records which incremental voltage step of the DAC output triggered the sense input to change. The process of the DAC continues until the sense input is triggered to change state and detected by the microcontroller, at which point, the process is repeated every second. Through this process, the microcontroller determines the absolute temperature of the battery by recording the incremental voltage step in the DAC output.

When a rechargeable battery pack 200 having a voltage within the fast chargeable voltage range is first inserted into the battery charger 300, high voltage cutoff 503 detects it and signals the microcontroller 508. Micro-controller 508 turns "charging" LED 510 ON to indicate to a user that the rechargeable battery pack 200 is being charged at a fast charge rate. When a substantially fully charged state is reached or a set point is exceeded, the Micro-controller 508 ordinarily signals to the fast charge/trickle charge switch 502 to cause it to switch into a trickle charge mode providing a trickle charge current to the rechargeable battery pack 200. Additionally when the battery pack 200 has substantially reached its fully charged state, microcontroller 508 turns ON the "Done" LED 509 to indicate to a user a charging cycle by the battery charger is completed.

Whenever power is first applied to the battery charger 300, the microcontroller performs a self test of itself and the battery thermistor 417 to ensure that there are no hardware problems that could cause unsafe operation of the battery charger. If a problem is found with the microprocessor or other circuitry of the battery charger during the self test, the microcontroller 508 disables the fast-charge circuitry and displays it's "charger error" status to the user. The microcontroller 508 indicates to a user a "charger error" status by alternately turning ON and OFF the LEDS 509 and 510 in a ping pong fashion. Having a "charger error" status, the battery charger will not attempt to fast-charge any battery already present or any battery inserted after this point. If after passing the self test the microcontroller 508 determines that the temperature sensor is functional, it then determines if there is a battery present. If there is no battery present (as indicated by perceived battery voltage being at or near the open-circuit voltage of the charge circuit), the fast-charge current source is kept disabled and the microcontroller 508 enters the "Sleep" phase described below. If a battery is present (as indicated by the perceived battery voltage being significantly below the open-circuit charger voltage), the microcontroller 508 begins the charge process. The charge process performed by the microcontroller can be thought of consisting of up to six phases. These phases are a "Pre-Charge" phase which always occurs during battery charger operation, a "Safety Delay" phase which may or may not occur, a "Fast Charge" phase which will always occur if possible, a "Safety Hold" phase which may or may not occur during the Fast Charge phase, an "End Charge" phase which always follows the Fast Charge phase, and a "Sleep" phase which always occurs at least once during the battery charger operation when the rechargeable battery pack is removed. In all phases; should any of the hardware safety circuits (i.e. low voltage cutoff 504, high temp cutoff 506, low temp cutoff 507) sense an unsafe condition (battery temperature too high or too low to safely fast-charge, temperature sensor inoperable, or battery voltage too low to safely fast-charge), the fast-charge circuitry will be automatically disabled and the charge current reduced to a minimum to prevent overheating or damage. As this is performed without assistance from the microcontroller 508, these safety circuits will prevent overheating or damage even if the microcontroller 508 has failed to unction correctly.

The Pre-Charge phase occurs before beginning any fast-charge operation. During the pre-charge phase, the microcontroller always performs a pre-charge settling procedure in which it waits for the computation of temperature information as a result of thermistor heating to become table. During this pre-charge phase, the charging current is kept to a minimum, the trickle charge, and the microcontroller 508 lights an indicator to advise the user that the charging process has begun. If the temperature is found to be too hot or too cold to safely fast-charge or the battery voltage is too low (indicating a short across the battery, a severely discharged battery or a reversed cell), the microcontroller 508 will enter the "Safety-Delay" phase. Once the temperature is stable and safe to fast-charge, and the battery voltage is safe to fast-charge, the microcontroller 508 enters the "Fast Charge" phase described below.

In "safety delay" phase, the microcontroller 508 holds the charge current at a minimum, the trickle charge rate, and displays to the user an indication that the charge has been delayed for safety reasons. The microcontroller 508 monitors the battery voltage and temperature every few seconds, and waits for the battery pack to become safe to fast-charge. If the battery pack is removed during the safety delay phase, the microcontroller 508 enters the "Sleep" phase. Once the battery temperature and battery voltage are safe for fast-charge, the microcontroller 508 restarts the charge process with the "Pre-Charge" phase.

During the "fast-charge" phase the fast-charge current is applied to the battery pack. The battery pack is constantly monitored for battery temperature and battery pack voltage every second, and a timer tracks the time the fast-charge current is applied to the rechargeable battery pack. If the battery temperature becomes too hot to continue fast-charge then the microcontroller 508 will enter the "End Charge" phase. If the battery temperature becomes too low to safely fast-charge or if the battery voltage becomes too low to safely fast-charge, the microcontroller 508 will enter the "Safety Hold" phase. Note that if the battery pack is removed during the fast-charge it may initially be detected as a too-high battery voltage. Otherwise, if the microcontroller 508 detects a temperature trend indicating that the battery is getting hotter in either a constant rate or an increasing rate with respect to time, it will enter the "End-Charge" phase. Additionally, after a time has elapsed (preferably 10 minutes in the case of four NiCad cells) of fast-charge current being applied to the battery pack, the microcontroller 508 enters the "End Charge" phase.

The "safety hold" phase is entered if the battery was initially safe for fast-charging, but during the fast-charge phase it became unsafe to continue fast-charging due to the battery temperature being too high or too low or the battery voltage becoming too low for some reason. In the safety hold phase, the charge current is reduced to its minimum, the trickle charge, and the timer is suspended to hold the present time value. The microcontroller 508 constantly tests the battery condition periodically (preferably every few seconds). If the battery conditions continue to indicate that it is unsafe to fast-charge, the microcontroller 508 will remain in Safety Hold phase until the battery is removed, at which time it will enter the "Sleep" phase described below. Once the battery conditions change and become safe to continue fast-charge, the microcontroller 508 restarts the fast-charge cycle as described in the "Fast Charge" phase.

In the "end charge" phase, the microcontroller 508 determines that the battery has completed the charge-cycle (either because it received the time allotment (10 minutes) of fast-charge current or because it heated up sufficiently during fast-charge phase to indicate that it could not hold any more charge), the microcontroller 508 turns OFF the fast-charge current and continues to trickle-charge the battery. An indicator light advises the user that the battery has been fully charged and can be removed. Once the battery is removed, the microcontroller 508 enters the "Sleep" phase.

In the "Sleep" phase, after detecting the battery has been removed (as indicated by the battery voltage being at or near the open-circuit voltage of the charge current sources), the microcontroller 508 turns all indicators off and disables the fast-charge current source. The microcontroller 508 then waits for an indication that a battery has been inserted (indicated by a drop in battery voltage to a level significantly below the open-circuit voltage of the charge current source), at which time it begins a new charge cycle with the "Pre-Charge" phase.

Figure 5B:
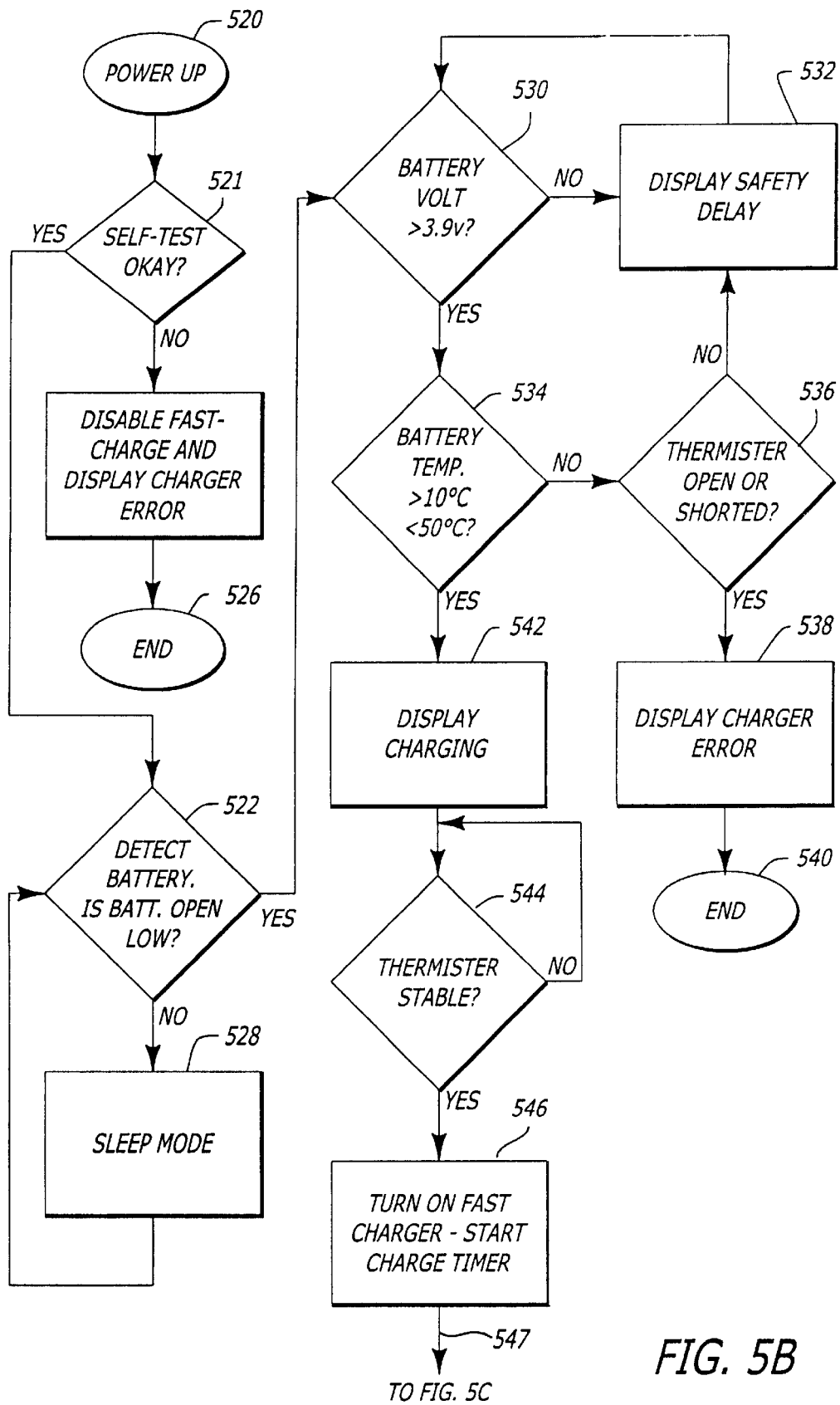
FIG. 5B is a first half of a flow chart for the battery charging system of FIG. 3.
Figure 5C:
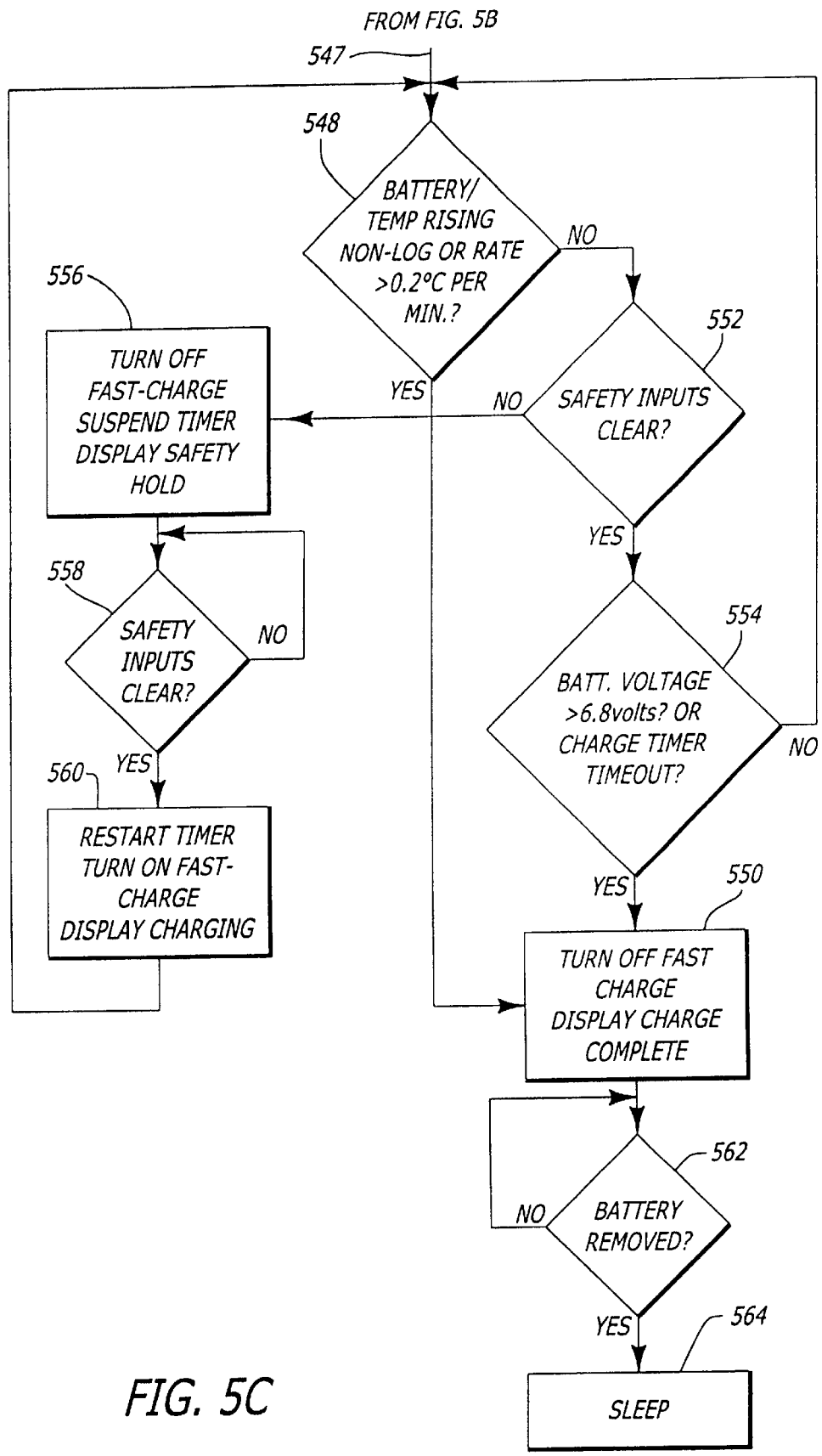
FIG. 5C is the second half of the flow chart for the battery charging system of FIG. 3.

The reader is now referred to FIG. 5B and FIG. 5C illustrating a flow chart of the charging control steps performed by the microcontroller 508 and its software over the operational phases previously described. Initially the microcontroller 308 performs a self test immediately after power up 521 of the battery charger 300 as indicated by step 521. If no problems exist, the next step 522 is performed. If a problem is encountered during the self test, the microcontroller disables the fast charge circuitry and displays a non-functional status to a user by alternately flashing the red light as indicated by step 524 and reaches the end 526. Next the microcontroller determines if a rechargeable battery pack is inserted for charging as illustrated by decision block 522. If no battery is detected, the battery charger goes into a sleep mode at step 528 and loops back to step 522 to determine if a rechargeable battery pack is inserted. Assuming that a rechargeable battery pack is installed, the microcontroller goes through steps to check the battery to see if it is suitable for fast charging and to initialize the thermistor 417 to a stable temperature. In step 530, the microcontroller of the battery charger 300 determines whether the voltage of the. rechargeable battery pack 200 is above a minimum fast charge voltage level for fast charging of 3.9 volts. If step 530 determines that the voltage of the rechargeable battery pack 200 is less than or equal to the minimum fast charge voltage level, the microcontroller goes to step 532 and indicates a "safety delay" to a user by flashing the "charging" LED 510 ON and OFF and then loops back to step 530. In the case that the rechargeable, battery pack 200 is greater than the minimum fast charge voltage level, the microcontroller goes to step 534 to determine if the rechargeable battery pack 200 is within the fast charge battery temperature range, greater than 10 degrees Celsius (a minimum fast charge battery temperature) and less than 40 degrees Celsius (a maximum fast charge battery temperature). If it is determined that the temperature of the battery in the rechargeable battery pack 200 is outside the fast charge temperature range, the microcontroller goes to step 536 where it is determined if the thermostat is open or short circuited. If the high temp cutoff 506 or the low temp cutoff 507 signal on TEMP ERROR that thermostat 417 is open or short circuited, the microcontroller 508 indicates to a user a "charger error" by alternately turning ON and OFF the LEDS 509 and 510 in a ping pong fashion and stops at the program end 540. If neither the high temp cutoff 506 nor the low temp cutoff 507 signal on TEMP ERROR that thermostat 417 is open or short circuited, then the microcontroller 508 goes to step 532 indicating a hold mode. If at step 534 it is determined that the temperature of the battery in the rechargeable battery pack 200 is within the fast charge temperature range, the microcontroller goes to step 542 to turn ON the charging LED 510 indicating to a user a charge cycle is in progress. Next the microcontroller 508 goes to step 544 where it is determined if the thermistor 417 has stabilized to a relatively stable value which can be measured. If the thermistor is not stable, the microcontroller 508 loops back around until the thermistor 417 has stabilized. Thermistor stabilization is achieved when the battery temperature reading does not change for five consecutive readings or five seconds. In the case that thermistor 417 has stabilized, the microcontroller goes to step 546 where a signal on the FAST CHARGE CUTOFF signal line is communicated to the safety cutoff switch 502 to begin the fast charge cycle. Additionally, the internal timer within the microcontroller 508 is started to determine the rate of temperature change in the rechargeable battery pack. Referring now to FIG. 8C, the microcontroller then goes to step 548. At step 548, the microcontroller proceeds to determine the rate of temperature rise in the rechargeable battery of the rechargeable battery pack. If the rate of temperature rise is a constant (i.e., a substantially linear temperature rise) or if the rate of temperature rise is increasing with respect to time (i.e., battery temperature increasing logarithmically), the microcontroller goes to step 550. At step 550, the microcontroller turns off the fast charge cycle and displays that the charging of the installed rechargeable battery pack is completed by turning ON the 'done" LED 509. If the microcontroller determines that the rate of temperature rise is not linear or increasing with respect to time, it goes to step 552 to check to see if the safety signals inputs are clear of malfunctions. At step 552, the microcontroller checks to be sure the safety systems are indicating proper operation. The safety input signals TEMP ERROR, received from either the high temp cutoff 506 or the low temp cutoff 507 and BATT SHORT received from the low voltage cutoff 504 are analyzed by the microcontroller 508. If these signals all indicate proper operation, the microcontroller goes to step 554. If one of the safety input signals indicate an error in operation, the microcontroller goes to step 556. At step 556, the microcontroller turns off the fast charge cycle, suspends the count of the timer and indicates to a user that the battery charger is in the safety hold phase by flashing ON and OFF the "charging" LED 510. At the next step 558 in the safety hold phase, the microcontroller continues in a loop monitoring the safety input signals to determine if they become all clear or if the battery pack is removed. If the battery pack is removed, the microcontroller goes into an end charge phase. If all the safety input signals become clear in one of the monitoring loops of the microcontroller, step 560 is executed. In step 560 the microcontroller restarts its internal timer, turns ON the fast charge cycle, and indicates to a user charging by turning ON the "charging" LED 510. The microcontroller next returns to step 548 and continues program execution. Assuming all safety input signals are clear at step 552, the microcontroller goes to step 554. At step 554, the microcontroller determines whether the battery voltage is greater than a charged voltage level (preferably 6.8 VDC for a four cell NiCad rechargeable battery pack) or if the internal timer has reached a maximum time value (preferably ten minutes for a four cell NiCad rechargeable battery pack) to timeout. If either occurs, representing a substantially fully charged rechargeable battery pack, the microcontroller goes to step 550. if neither occurs, the battery charger continues to charge in a fast charge cycle using the fast charge current and returns in a loop to perform step 548. As previously discussed, the microcontroller at step 550 is in a end charge phase and turns off the fast charge cycle and displays that the charging of the installed rechargeable battery pack is completed by turning ON the 'done" LED 509. The microcontroller then goes to step 562 to determine if the rechargeable battery pack is still inserted into the battery charger. If the battery pack is still inserted, the battery charger 300 continues to charge the battery pack in a trickle charge mode and the microcontroller 508 loops back around to step 562 to determine if the battery pack has been removed. if the battery pack is removed, the microcontroller goes to step 564 and enters into the sleep phase awaiting insertion of a rechargeable battery pack.

Figure 6A:
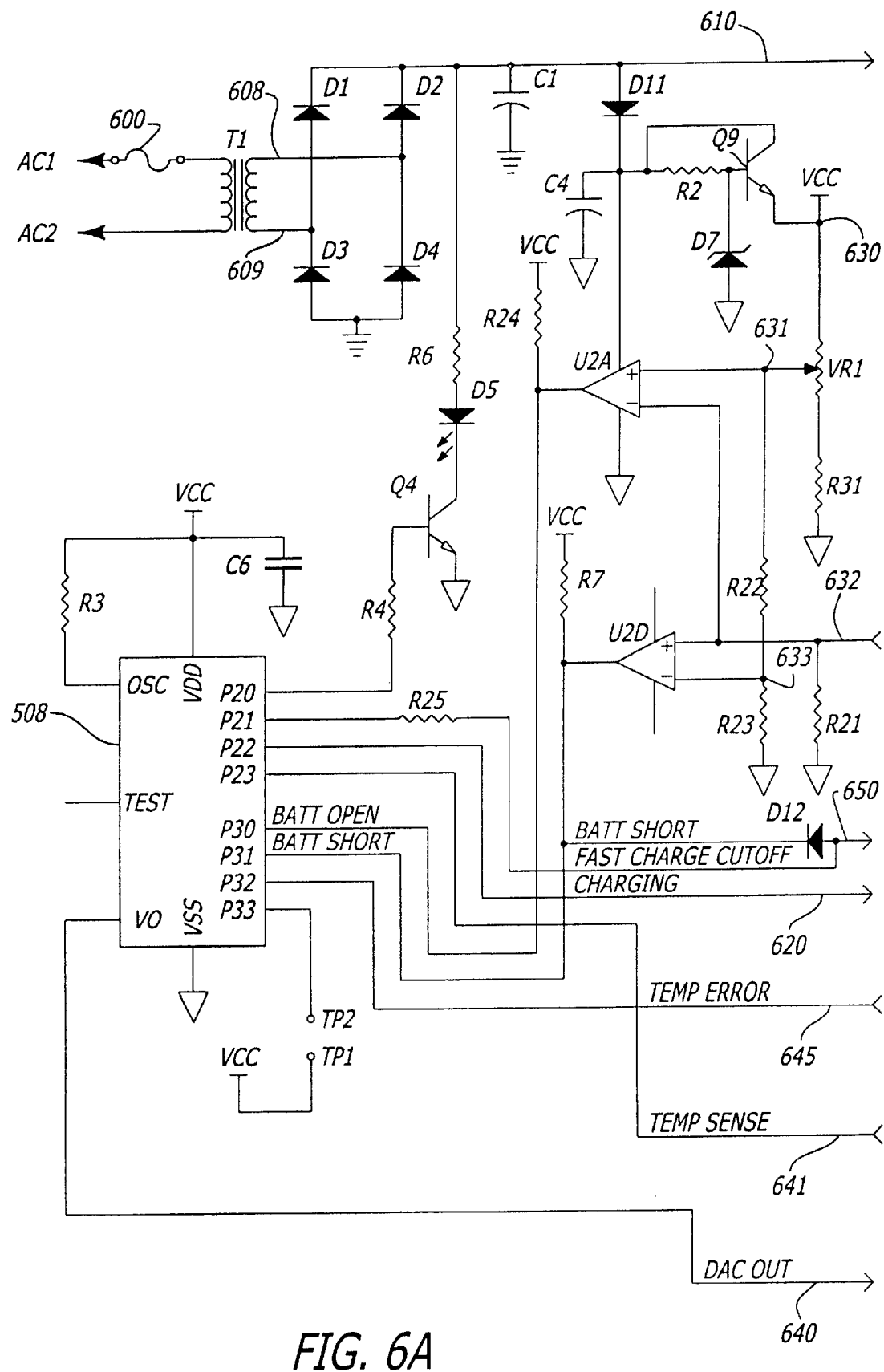
FIG. 6A is a first half of a schematic diagram of the battery charging system of FIG. 3.
Figure 6B:
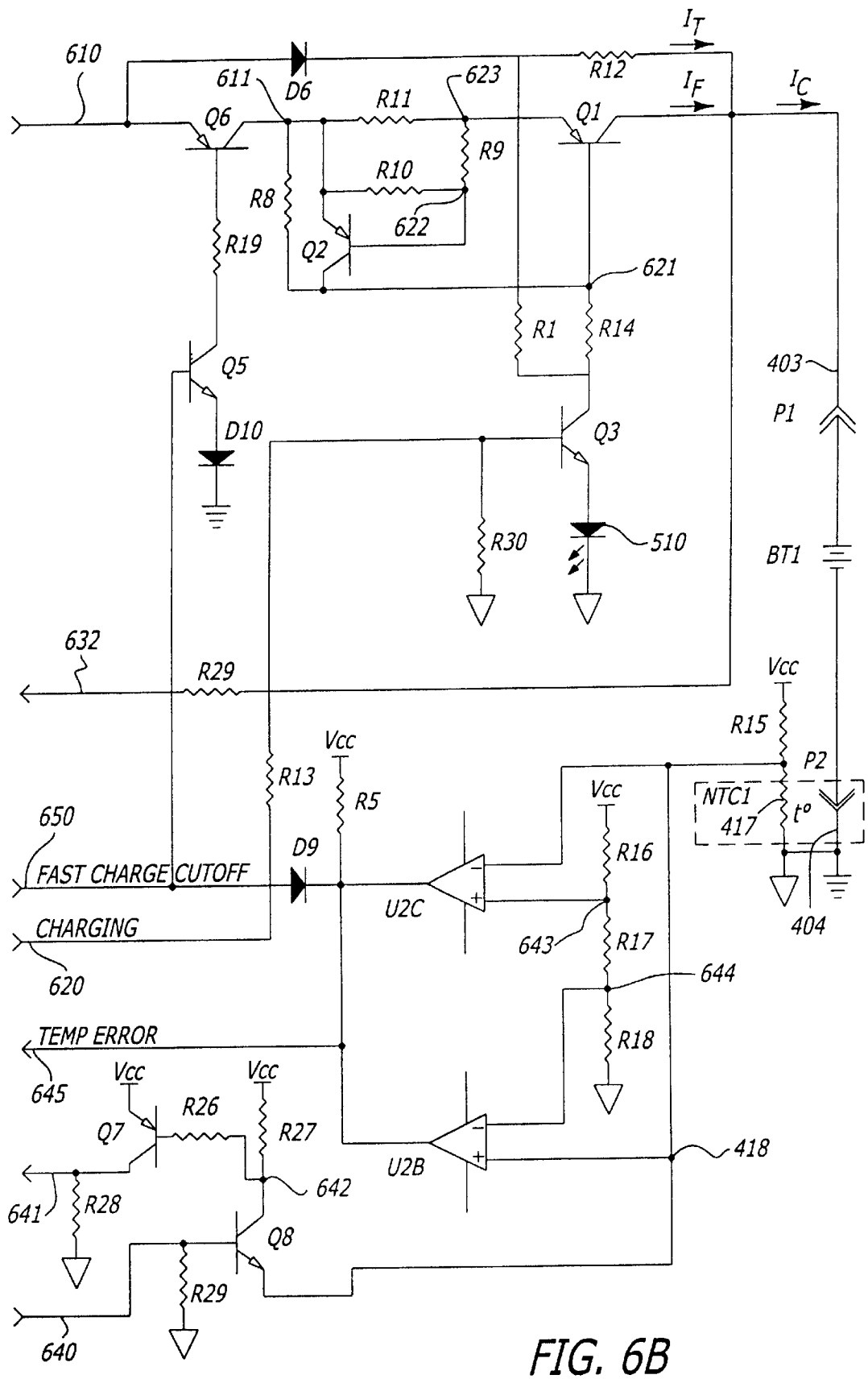
FIG. 6B is the second half of the schematic diagram of the battery charging system of FIG. 3.

Reference is now made to FIGS. 6A and 6B illustrating a schematic diagram of the battery charging system of FIG. 3. Battery charger 300 uses thermal sensing at its negative charging terminal 404 to sense the temperature of a battery within the rechargeable battery pack 200 as an indication of its charge state.

Dual power supply 501 includes the transformer T1, safety fuse 600, diodes D1–D4, capacitors C1 and C4, zener diode D7, diode D11, Transistor Q9, resistors R2 and R31, and variable resistor VR1. The unregulated power supply generated by the dual power supply 501 is provided on node 610 and in the preferred embodiment it is approximately 9 volts DC at six hundred fifty DC milliamps of output current under load and 12.5 volts DC under no load. Battery charger 300 includes a safety fuse 600 between AC terminal AC1 and the primary winding of the transformer T1. Transformer T1 receives an AC voltage from wall outlet 302 by means of a pair of power spades 301 coupled to the terminals AC1 and AC2. Based on the ratio of the windings, transformer T1 converts the AC voltage received from the wall outlet 302 to a lower AC voltage at the output of the secondary windings on nodes 608 and 609. The lower AC voltage across nodes 608 and 609 is rectified by the diodes D1–D4 into a DC voltage at output 610. Capacitor C1 filters the DC output voltage generated by the diodes D1–D4. Capacitor C4, zener diode D7, diode D11, transistor Q9, resistors R2 and R31, and variable resistor VR1 provide the regulated power supply output VCC on node 630 and in the preferred embodiment it is approximately 4.5 volts DC.

The fast/trickle charge switch 502 includes resistors R1, R8–R11, R13, R14, and R30, and PNP bipolar junction transistors (BJT) Q1–Q3. The "charging" LED 510 couples to the emitter of BJT Q3 to complete the circuit to ground. Transistors Q1 and Q2 in conjunction with resistors R8–R11 regulate the current provided by the power supply 501 into a fast charge current that may be selectively provided to a rechargeable battery pack BT1 200, connected to the charging terminals P1 403 and P2 404. Because of the high current provided by the fast/trickle charge switch 502, transistor Q1 includes a heat sink, preferably rated at one watt, for dissipating heat. The emitter, base and collector of transistor Q1 are respectfully coupled to node 623, node 621, and positive charging terminal 403. The emitter, base and collector of transistor Q2 are respectfully coupled to node 611, node 622, and node 621. Resistor R11 is a fused type of resistor to protect the rechargeable battery pack 200 from overcurrents in the unlikely event that transistor Q1 fails and short circuits node 623 and node 403 together.

The trickle charge current source regulator 512 is provided by diode D6 and resistor R12. The safety cutoff switch 511 is provided by transistors Q5 and Q6, diode D10 and resistor R19. If the fast charge current is not to be provided, either of transistor Q1 or Q6 is turned OFF so that only a trickle charge current is provided through the diode D6 and resistor R12 from the power supply 501 to the rechargeable battery pack 200. When a fast charge current is desired, microcontroller 508 causes CHARGING signal on node 620 to turn ON transistor Q3 and the "charging" LED 510 while the FAST CHARGE CUTOFF signal on node 650 holds transistor Q5 turned ON which in turn causes transistor Q6 to be ON. The cathode of "charging" LED 510 is coupled to the emitter of transistor Q3 while its anode is coupled to ground. Through resistor R13, the CHARGING signal on node 620 is coupled to the base of transistor Q3 in it ON and OFF. Through resistor R14, the collector of transistor Q3 is coupled to node 621 and the base of transistor Q1 such that when transistor Q3 is turned ON, the base of transistor Q1 goes low turning it ON in order to allow the fast charge current IF flow. The resistor bias network of resistors R9–R11 set the base voltage of transistor Q2 to approximately 0.55 V when the current through resistor R12 is between 550 and 600 milliamps. Transistor Q2 will start conducting where the current through resistor 613 goes above 550 milliamps which in turn will pull up node 621 in order to provide a substantially constant fast current source flowing into node 403. When it is detected that the rechargeable battery pack 200 is in the desired fully charged state, microcontroller 508 shuts OFF the fast current by causing the FAST CHARGE CUTOFF signal on node 650 to turn OFF transistor Q5 which in turns shuts OFF transistor Q6. Without the fast charge current, a trickle charge current is provided to the rechargeable battery pack 200 by means of diode D6 and resistor R12 coupled in series together between node 610 and the positive charging terminal 403.

The temperature sensing of the battery temperature by the battery charger is provided by the battery thermistor 417 and the pull up resistor R15. Pull up resistor R15 provides a bias current for the thermistor 417. As the heat or temperature of the battery and terminal 404 change, through the thermal coupling, the thermistor resistance varies proportionately. If the temperature of the battery in rechargeable battery pack 200 increases, it causes the resistance of thermistor 417 to decrease. By means of voltage division provided by the resistances, if the resistance of the battery thermistor 417 decreases then the voltage on node 418 decreases.

The temperature sense converter 505 is provided by the transistors Q7 and Q8 and the resistors R26–R29. The temperature sense converter 505 couples to the microcontroller 508 and the temperature sensing provided by the battery thermistor 417 and the pull up resistor R15. The microcontroller successively outputs a ramp current onto the output DACOUT 640, which forms a voltage across resistor R29. The greater the rate of ramp current on the output DACOUT, the greater is the voltage on resistor R29. The voltage across the thermistor 417 indicating battery temperature is coupled onto the emitter of transistor Q8. When the voltage on resistor R29 exceeds the voltage across the thermistor 417 by a diode drop of the base emitter junction of Q8, transistor Q8 turns ON. When transistor Q8 turns ON, it causes transistor Q7 to turn on which drives a high logic level signal onto the input TEMP SENSE 641 to the microcontroller 508. The voltage across the thermistor 417 which is coupled into the emitter of transistor Q8, changes due to the resistive variation of the thermistor 417 in inverse proportion to battery temperature fluctuations coupled to it. In other words, as the battery temperature increases, the voltage across the thermistor 417 decreases.

High voltage cutoff 503 is provided by comparator U2A in conjunction with resistors R20–R23 and the voltage provided through the variable resistor VR1. Resistors R20–R23 in conjunction with the variable resistor VR1 set the maximum chargeable voltage level on node 631 as a reference voltage input into the positive input terminal of comparator U2A. When inserted, the voltage of the rechargeable battery pack 200 is provided on the positive charging terminal 403 and input into the negative input terminal of comparator U2A on node 632. The maximum chargeable voltage level in the preferred embodiment is set to 6.8 volts DC. Thus, if the voltage on the positive charging terminal 403 exceeds 6.8 volts DC, comparator U2A causes its output BATT OPEN to go low signaling to the microcontroller 508. In conjunction with other information, the microcontroller may turn off the fast charge mode and cause the battery charger to go into a trickle charge mode. A battery with high impedance or open circuit may cause the voltage at node 403 to exceed 6.8 volts DC. If the voltage on the positive charging terminal 403 is less than or equal to 6.8 volts DC, comparator U2A does not signal the microcontroller 508 and the battery charger may continue in a fast charge mode if no other condition exists to do otherwise.

Low voltage cutoff 504 is provided by comparator U2D in conjunction with resistors surrounding it. The minimum fast chargeable voltage level is a reference voltage input into the negative input terminal of comparator U2D. The minimum fast chargeable voltage level is set on node 633 by the voltage division provided by resistors R23 and R22 of the voltage. on node 631. The minimum fast chargeable voltage level provided on node 633 in the preferred embodiment is 3.9 volts DC to match a rechargeable battery pack 200 having 4 NiCad battery cells. This level provides for the manufacturer's specification of minimum voltage level and an additional margin in case a battery cell is shorted and the other batteries in the pack are at full potential. When inserted, the voltage of the rechargeable battery pack 200 is provided on the positive charging terminal 403 and input into the positive input terminal of comparator 634 on node 632. Thus, if the voltage of the rechargeable battery pack on the positive charging terminal 403 is below the minimum chargeable voltage level of 3.9 volts DC, comparator 634 causes it output BATT SHORT to go low signaling to the microcontroller 508 that it is going to turn off the fast charge mode and cause the battery charger to go into a trickle charge mode. After trickle charging, a battery pack 200 may become sufficiently charged to exceed the minimum fast chargeable voltage level of 3.9 VDC on node 403. If other safety input signals are clear, comparator U2D signals the microcontroller that it can provide a fast charging current. If the voltage on the positive charging terminal 403 remains above the minimum fast chargeable voltage level of 3.9 volts DC, comparator 634 allows the microcontroller 508 to continue in a fast charging mode if no other condition exists to do otherwise. The fast chargeable voltage range, from maximum fast chargeable voltage level to minimum fast chargeable voltage level, is generated by the voltage comparisons and the signaling performed by the high voltage cutoff 503 and low voltage cutoff 504 to the microcontroller 508 and the safety cutoff switch 511.

The High voltage cutoff 503 also detects whether a rechargeable battery pack 200 is inserted for charging or removed from the battery charger. Without a rechargeable battery pack 200 inserted into the battery charger 300, there is no current flow between node 610 and the positive charging terminal 403 such that the voltage on the positive charging terminal 403 can become the same as the voltage on node 610 or nearly 12.5 volts DC in the preferred embodiment. Without an installed battery pack, comparator U2A compares the 12.5 volts from the power supply 501 under no load with the maximum fast chargeable voltage level 6.8 volts DC and signals the microcontroller 508 that a rechargeable battery pack is not installed or that a rechargeable battery pack exceeding the maximum fast chargeable voltage level is installed. In the case that a rechargeable battery pack 200 is installed into the battery charger 300 and its voltage is within the fast chargeable voltage range, comparators U2A and U2D signal the microcontroller 508 of such on signal lines BATT OPEN and BATT SHORT respectively.

The high temperature cutoff 506 is provided by comparator U2B and resistors R16–R18. The low temperature cutoff 507 is provided by comparator U2C and resistors R16–R18. Resistors R16, R17 and R18 set reference voltages on nodes 643 and 644 representing the absolute permissible battery temperature range for fast charging an installed rechargeable battery pack. The voltage on node 643 represents a minimum fast charge temperature for fast charging the rechargeable battery pack. The voltage on node 644 represents the maximum safety fast charge temperature for fast charging the rechargeable battery pack. In the preferred embodiment, for a minimum fast charge temperature of 10 degrees centigrade the voltage on node 643 is set to approximately 2.68 volts DC. In the preferred embodiment, for a maximum safety fast charge temperature of 50 degrees centigrade the voltage on node 644 is set to approximately 0.52 volts DC. The voltage values on nodes 643 and 644 additionally allow for the detection of an open circuit or a short circuit in thermistor 417 respectively.

The voltage across the thermistor 417 is coupled into the negative input terminal of comparator U2C on node 418. The voltage across the thermistor 417 is coupled into the positive input terminal of comparator U2B on node 418. Node 643 couples the reference voltage representing the minimum fast charge temperature into the positive input terminal of the comparator U2C. Node 644 couples the reference voltage representing the maximum fast charge temperature into the negative input terminal of the comparator U2B.

As the battery temperature goes low, the resistance of the thermistor 417 increases thereby increasing the voltage across the thermistor 417. If the battery temperature is too low, the resistance of the thermistor 417 may be so large as to cause the voltage across the thermistor 417 to become greater than the 2.68 volts (representing the minimum fast charge temperature) on node 643 causing the comparator U2C to generate a low logic level on TEMP ERROR 645. The TEMP ERROR is an active low signal which signals to the battery charger that a safe range of temperatures for the rechargeable battery is exceeded or the thermistor is faulty. In the more likely case that the battery temperature goes high, the resistance in thermistor 417 decreases thereby lowering the voltage across it which found on node 418. The thermistor voltage on node 418 is coupled into the positive input terminal of comparator U2B and may become so low that it is less than the 0.52 volts (representing the maximum fast charge safety temperature) on node 644 causing the comparator U2B to generate a low logic level on TEMP ERROR 645. In either case, the operation of the high temp cutoff 506 and the low temp cutoff 507 is independent of the microcontroller 508. TEMP ERROR 645 is coupled into the microcontroller 508 as well as the safety cutoff switch 511 through diode D9 and the signal line of FAST CHARGE CUTOFF 650. In the case that a low logic level is driven onto the TEMP ERROR 645, transistor Q6 of the safety cutoff switch 511 is turned OFF thereby creating an open circuit between the dual power supply 501 and the fast/trickle charge switch 502 so that the fast charge current is disabled. In the case that thermistor 417 is short circuited, the voltage on node 418 is near zero causing comparator U2B to indicate an operational error on TEMP ERROR 645 by driving it to a low logic level. In the case that thermistor 417 is open circuited, the voltage of VCC is provided on node 418 through pull up resistor R15. The voltage of VCC is greater than the 2.68 volts (representing the minimum fast charge temperature) on node 643 causing the comparator U2C to generate a low logic level on TEMP ERROR 645. The microcontroller detects a shorted thermistor by verifying that the temperature sense input 641 goes low when the DAC output 640 equals the base emitter voltage (VBE) of transistor Q8 for two consecutive readings. The microcontroller detects an open thermistor by verifying that the temperature sense input 641 never goes low throughout the full range of the DAC output 640.

Microcontroller 508 is a general purpose microcontroller that includes an internal programmable ROM and an interface to external program and scratch pad memory. Microcontroller may also be a general purpose processor with memory for program control. Because the charging control program and its algorithms are simple, an expensive microcontroller with expensive logic components such as an arithmetic logic unit (ALU) are not necessary. The microcontroller 508 includes at least one internal timer and a digital to analog converter. The timer is used to determine the rate of change in battery temperature. The DAC is for determining the relative level of battery temperature in order to compute the rate of change in battery temperature. A software program is executed by the microcontroller to control the battery charger operations. The microcontroller accepts a number of input signals and generates a number of output signals as illustrated in FIG. 5A and FIGS. 6A and 6B to control the battery charger and provide status information to a user.

The electronic components previously described for the battery charger 300 have been selected such that it is specifically designed to charge a specific rechargeable battery pack having NiCad batteries therein. Charger 300 provides two charging currents which are fixed as a function of the electronic components selected. The cutoff temperature threshold value for determining what charge current to provide during the comparisons of ambient temperature with battery temperature is fixed by the selection of electronic components for the battery charger 300. The battery charger 300 may be altered to charge different battery types in a rechargeable battery pack by selecting different components and different component values. Different currents may be provided by altering the electronic component values or selecting different components. The cutoff temperature threshold value may be altered by changing the component values or selecting different components.

Figure 7:
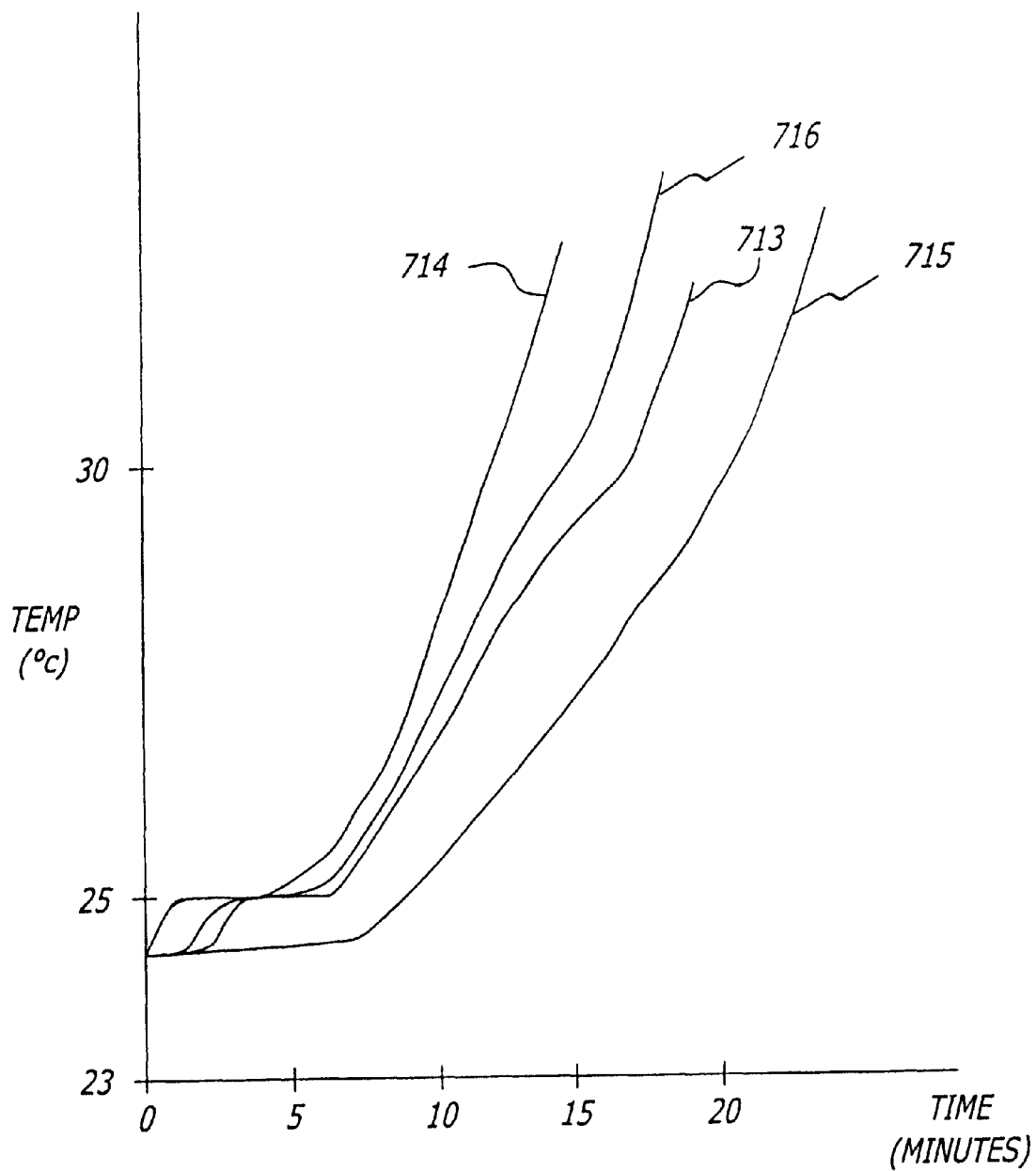
FIG. 7 is a graph of temperature measurements at the negative terminal of the battery, the positive terminal of the battery and the internal case temperature of a battery with all being plotted against time.

Reference is now made to FIG. 7. FIG. 7 is a graph of temperature versus time of empirical data when measuring battery temperature at various points of the rechargeable battery pack 200. Curves 713, 714, 715 and 716 illustrate where it is preferable to measure battery temperature on a battery. Curve 713 illustrates the temperature being measured at a positive pole of a battery through the positive charging terminal 403 of the battery charger 300. Curve 714 indicates the temperature being measured at a negative pole of a battery through the negative charging terminal 404 of the battery charger 300. Curve 715 illustrates the temperature being measured internally within the case of the battery charger 300. Curve 716 illustrates the temperature being measured at the side of a battery. A larger slope in a curve shows that there is greater temperature change sensed by a thermistor per minute of time. Of particular interest is a charging time between five and ten minutes that battery charger 300 is capable of charging a rechargeable battery pack 200. Curve 714 provides the higher slope and therefore better measurement sensitivity in the desired charging time period between five and ten minutes. Therefore, the curves of FIG. 7 illustrate that sensing temperature at the pole of the negative battery terminal is preferable. The pole of the negative battery terminal coupled to a sensor in the negative charging terminal 404 is the more sensitive point within the charging system to use as an indication of the charge condition for a rechargeable battery pack.

Figure 8:
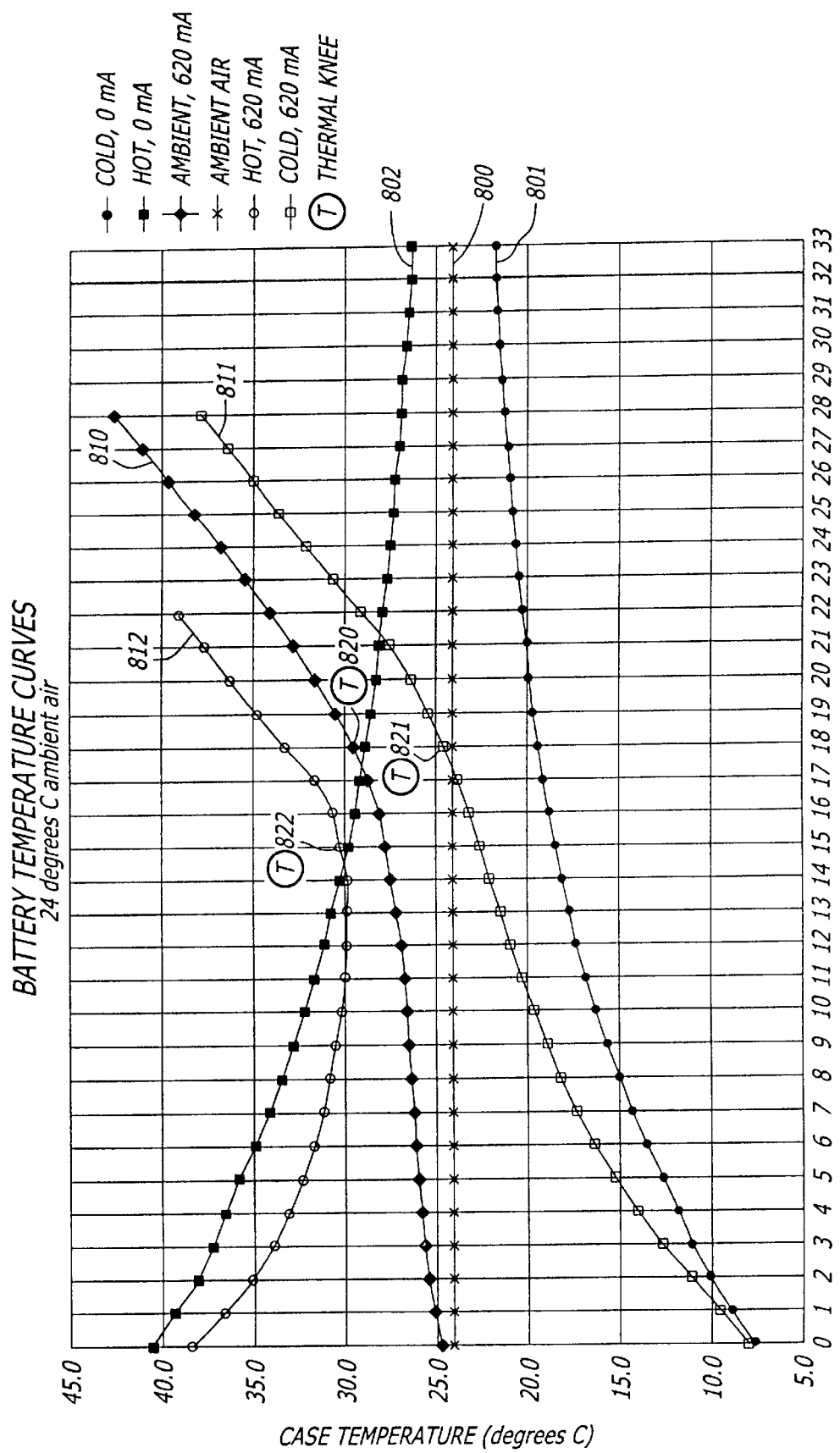
FIG. 8 is a graph of temperature measurements at the negative terminal of a rechargeable battery in the rechargeable battery pack for various initial battery temperatures all being plotted against time.

Reference is now made to FIG. 8. FIG. 8 is a graph of temperature versus time for empirical data measured at the negative terminal of a rechargeable battery in a discharged rechargeable battery pack 200 when the battery charger 300 fast charges from various initial battery temperatures. The curves illustrated in FIG. 8 are thermal charging curves which show the battery charging characteristics utilized in setting the software and hardware for detecting when a rechargeable battery pack is being overcharged. In FIG. 8, straight line 800 illustrates the ambient temperature surrounding the battery charger 300 into which the rechargeable battery pack 200 is introduced. Curve 801 is the "Cold, Oma" curve which illustrates a battery that is colder than the ambient temperature of the charger and its rate of thermal equilibration when not being charged. The temperature rise of curve 801 is a logarithmic function which is taken into account in the design of the thermal detection scheme in the present invention. This temperature gradient shown by curve 801 occurs when a battery is cold with respect to the charger such as when a battery has been stored outside or in the garage during winter and the charger is indoors at an ambient temperature.

Curve 802 is the "Hot, Oma" curve which illustrates a battery which is warmer than the ambient temperature of the charger and its rate of thermal equilibration when not being charged. The temperature curve 802 is also a logarithmic function which is taken into account in the design of the thermal detection scheme in the present invention. Additionally, the battery charger needs to compensate for the fact that the initial battery temperature is cold, below the ambient temperature or hot, above the ambient temperature. The battery charger compensates for this cold or hot initial battery temperature in its charging control because the battery will show overcharge temperature characteristics at lower or higher temperatures than a battery would at ambient.

Curves 810, 811, and 812 are the "Ambient 620ma", "Cold 620ma", and "Hot 620ma" curves respectively illustrating the thermal curves of rechargeable batteries which are being charged. Each of the curves 810, 811, and 812 have a different initial battery temperature with respect to the ambient temperature prior to charging. In each of curves 810, 811, and 812 the rechargeable batteries exhibited their respective characteristic overcharge thermal knee 820, 821, and 822 where the batteries are substantially fully charged. After reaching their respective characteristic thermal knee 820, 821, and 822, the curves 810, 811, and 812 become non-logarithmic and the temperature of the battery increases at a increasing rate with respect to time or a constant rate with respect to time. Thus, the software algorithm utilized for temperature sensing and determining when batteries are substantially fully charged, looks for a temperature rise that occurs at an ever-increasing rate or a constant rate with respect for time. Additionally, from curves 810, 811, and 812, it can be seen that the substantially fully charged state is not reached until the rate of temperature rise reaches a level of at least 0.6 degrees centigrade per minute. Thus even though the temperature rise of a battery is occurring at an ever-increasing rate or a constant rate, until that rate reaches 0.6 degrees centigrade per minute, the battery can still be charged at a fast charge rate.

The present invention has many advantages over the prior art. One advantage is that the thermistor is placed in the battery charger to sense temperature on the rechargeable battery pack at the negative charging terminal. Another advantage to the present invention is that temperature is sensed in the rechargeable battery pack at the pole of the negative terminal of a battery cell which provides a more sensitive thermal location to indicate charge condition. Another advantage of the present invention is that it has fewer mechanical components that can wear out and therefore it inherently is more reliable. Another advantage is that a thermistor need not be embedded into a battery back to sense temperature changes and therefore lowers the cost of a rechargeable battery pack charging system. Another advantage is that the charger includes independent safety systems to automatically shut off a fast charge current to a battery for added safety. Another advantage is that the temperature sensing algorithm is simple and can compensate for extreme variations in the initial battery temperature.

The preferred embodiments of the present invention are thus described. While the present invention has been described in particular embodiments, the present invention should not be construed as limited by such embodiments. For example, the present invention has been described with respect to charging a rechargeable battery pack. The present invention is equally applicable to charging a rechargeable battery without the battery pack. The present invention should not be limited to the embodiments disclosed but rather construed according to the claims that follow below.

What is claimed is:

1. A method of controlling the charging of a rechargeable battery pack, the method comprising:

(a) coupling the rechargeable battery pack to a battery charger;

(b) fast charging the rechargeable battery pack by providing a fast charging current to the rechargeable battery pack;

(c) measuring a battery temperature of the rechargeable battery pack;

(d) determining a rate of increase in battery temperature during the fast charging to determine a charge condition of the rechargeable battery pack; and (e) terminating the fast charging when it is determined that the rate of increase in battery temperature is greater than a maximum rate of increase or when it is determined that the increase in battery temperature is rising non-logarithmically, each indicating that the charge condition of the rechargeable battery pack is substantially full.

2. The method of claim 1 of controlling the charging of a rechargeable battery pack, the method further comprising:

providing a predetermined period of time between measuring the battery temperature of the rechargeable battery pack to determine the rate of increase in battery temperature.

3. The method of claim 1 of controlling the charging of a rechargeable battery pack, the method further comprising:

comparing a voltage of the rechargeable battery pack with a first reference voltage prior to the fast charging of the rechargeable battery pack to determine if it is safe to charge the rechargeable battery pack.

4. The method of claim 3 of controlling the charging of a rechargeable battery pack wherein, the first reference voltage is a minimum chargeable voltage level, the comparing of the voltage of the rechargeable battery pack with the minimum chargeable voltage level determines that it is below the minimum chargeable voltage level, indicating that it is unsafe to charge the rechargeable battery pack with the fast charging current, and in response, skipping the fast charging of the rechargeable battery pack, and trickle charging the rechargeable battery pack by providing a trickle charging current to the rechargeable battery pack.

5. The method of claim 3 of controlling the charging of a rechargeable battery pack wherein, the first reference voltage is a minimum chargeable voltage level, and the comparing of the voltage of the rechargeable battery pack with the minimum chargeable voltage level determines that it is above the minimum chargeable voltage level.

6. The method of claim 1 of controlling the charging of a rechargeable battery pack, the method further comprising:

comparing the battery temperature of the rechargeable battery pack with a reference level prior to the fast charging of the rechargeable battery pack to determine if it is safe to charge the rechargeable battery pack.

7. The method of claim 6 of controlling the charging of a rechargeable battery pack wherein, the reference level is a maximum battery temperature level, and the comparing of the battery temperature of the rechargeable battery pack with the maximum battery temperature level determines that it is over the maximum battery temperature level indicating that it is unsafe to charge the rechargeable battery pack with the fast charging current.

8. The method of claim 6 of controlling the charging of a rechargeable battery pack wherein, the reference level is a minimum battery temperature level, and the comparing of the battery temperature of the rechargeable battery pack with the minimum battery temperature level determines that it is under the minimum battery temperature level indicating that it is unsafe to charge the rechargeable battery pack with the fast charging current.

9. The method of claim 1 controlling the charging of a rechargeable battery pack wherein, the battery temperature of the rechargeable battery pack is measured by coupling a temperature sensor to a negative terminal of a battery within the rechargeable battery pack.

10. The method of claim 9 of controlling the charging of a rechargeable battery pack wherein, the temperature sensor is a thermistor coupled to a negative charging terminal of the battery charger.

11. The method of claim 1 of controlling the charging of a rechargeable battery pack wherein, the battery temperature of the rechargeable battery pack is measured by coupling a temperature sensor to a negative pole of a negative terminal of a battery within the rechargeable battery pack.

12. The method of claim 11 of controlling the charging of a rechargeable battery pack wherein, the temperature sensor is a thermistor coupled to a negative charging terminal of the battery charger.

13. A method of safely charging a rechargeable battery pack, the method comprising:

coupling a rechargeable battery pack to a battery charger;

measuring a voltage of the rechargeable battery pack to determine if the voltage of the rechargeable battery pack is safe to fast charge the rechargeable battery pack;

measuring a battery temperature of the rechargeable battery pack to determine if the battery temperature is within a safe temperature range to fast charge the rechargeable battery pack fast charging the rechargeable battery pack by providing a fast charging current to the rechargeable battery pack if the measuring of the voltage and the measuring of the battery temperature indicate it is safe to fast charge;

determining a rate of increase in battery temperature during the fast charging to determine a charge condition of the rechargeable battery pack; and terminating the fast charging of the rechargeable battery pack in response to the charge condition of the rechargeable battery pack.

14. The method of claim 13 wherein, the battery temperature of the rechargeable battery pack is measured at a negative terminal of a battery in the rechargeable battery pack.

15. The method of claim 13 wherein, the terminating of the fast charging is responsive to the charge condition of the rechargeable battery pack being substantially full as indicated by the rate of increase in battery temperature being greater than a maximum rate of increase.

16. The method of claim 13 wherein,
the terminating of the fast charging is responsive to the charge condition of the rechargeable battery pack being substantially full as indicated by the rate of increase in battery temperature rising non-logarithmically.

17. The method of claim 13 wherein,
the terminating of the fast charging is responsive to the charge condition of the rechargeable battery pack being unsafe as indicated by the measuring of the voltage of the rechargeable battery pack having an unsafe voltage to fast charge.

18. The method of claim 17 wherein,
the terminating of the fast charging is also responsive to the charge condition of the rechargeable battery pack being substantially full.

19. The method of claim 18 wherein,
the charge condition of the rechargeable battery pack being substantially full is indicated by the rate of increase in battery temperature rising non-logarithmically.

20. The method of claim 17 wherein,
the charge condition of the rechargeable battery pack being substantially full is indicated by the rate of increase in battery temperature being greater than a maximum rate of increase.

21. The method of claim 20 wherein,
the charge condition of the rechargeable battery pack being substantially full is also indicated by the rate of increase in battery temperature rising non-logarithmically.

22. The method of claim 13 further wherein,
the measuring of the voltage of the rechargeable battery pack to determine if the voltage of the rechargeable battery pack is safe to fast charge the rechargeable battery pack includes
comparing the voltage of the rechargeable battery pack with a reference voltage to determine if it exceeds or falls below the reference voltage.

23. The method of claim 22 wherein,
the reference voltage is a minimum chargeable voltage level,
the voltage of the rechargeable battery pack measures below the minimum chargeable voltage level indicating that it is unsafe to fast charge,
and the method further includes,
skipping the fast charging of the rechargeable battery pack, and
trickle charging the rechargeable battery pack by providing a trickle charging current to the rechargeable battery pack.

24. The method of claim 22 wherein,
the reference voltage is a maximum chargeable voltage level,
the voltage of the rechargeable battery pack measures above the maximum chargeable voltage level indicating that it is unsafe to fast charge,
and the method further includes,
skipping the fast charging of the rechargeable battery pack, and
trickle charging the rechargeable battery pack by providing a trickle charging current to the rechargeable battery pack.

25. A battery pack charger comprising:
a means for measuring a voltage of a rechargeable battery pack to determine if the voltage of the rechargeable battery pack is safe to fast charge the rechargeable battery pack;
a means for measuring a battery temperature of the rechargeable battery pack to determine if the battery temperature is within a safe temperature range to fast charge the rechargeable battery pack
a means for fast charging the rechargeable battery pack by providing a fast charging current to the rechargeable battery pack if the means for measuring the voltage and the means for measuring the battery temperature indicate it is safe to fast charge the rechargeable battery pack;
a means for determining a rate of increase in battery temperature during the fast charging to determine a charge condition of the rechargeable battery pack; and
a means for terminating the fast charging of the rechargeable battery pack in response to the charge condition of the rechargeable battery pack.

26. The battery pack charger of claim 25 wherein,
the means for terminating the fast charging is responsive to the charge condition of the rechargeable battery pack being substantially full as indicated by the means for determining the rate of increase detecting that the rate of increase in battery temperature is greater than a maximum rate of increase.

27. The battery pack charger of claim 25 wherein,
the means for terminating the fast charging is responsive to the charge condition of the rechargeable battery pack being substantially full as indicated by the means for determining the rate of increase detecting that the rate of increase in battery temperature is rising non-logarithmically.

28. The battery pack charger of claim 25 wherein,
the means for terminating the fast charging is responsive to the charge condition of the rechargeable battery pack being unsafe as indicated by the means for measuring the voltage of the rechargeable battery pack determining that the rechargeable battery pack having an unsafe voltage to fast charge.

29. The battery pack charger of claim 28 wherein,
the means for terminating the fast charging is also responsive to the charge condition of the rechargeable battery pack being substantially full.

30. The battery pack charger of claim 29 wherein,
the charge condition of the rechargeable battery pack being substantially full is indicated by the means for determining the rate of increase in battery temperature detecting that the rate of increase in battery temperature is greater than a maximum rate of increase.

31. The battery pack charger of claim 30 wherein,
the charge condition of the rechargeable battery pack being substantially full is also indicated by the means for determining the rate of increase in battery temperature detecting than the rate of increase in battery temperature is rising non-logarithmically.

32. The battery pack charger of claim 29 wherein,
the charge condition of the rechargeable battery pack being substantially full is indicated by the means for determining the rate of increase in battery temperature detecting that the rate of increase in battery temperature is rising non-logarithmically.

* * * * *